United States Patent
Miyami et al.

(10) Patent No.: US 8,318,377 B2
(45) Date of Patent: Nov. 27, 2012

(54) MEMBRANE-ELECTRODE JUNCTION AGENT, PROTON CONDUCTING MEMBRANE HAVING JUNCTION LAYER, MEMBRANE-ELECTRODE ASSEMBLY, POLYMER ELECTROLYTE FUEL CELL, AND MANUFACTURING METHOD OF THE MEMBRANE-ELECTRODE ASSEMBLY

(75) Inventors: Toshihito Miyami, Tsukuba (JP); Yoshiharu Konno, Tsukuba (JP); Hideyasu Nakajima, Tsukuba (JP); Masashi Kanoh, Tsukubamirai (JP)

(73) Assignee: Sekisui Chemical Co., Ltd., Osaka (JP)

( * ) Notice: Subject to any disclaimer, the term of this patent is extended or adjusted under 35 U.S.C. 154(b) by 574 days.

(21) Appl. No.: 12/531,242

(22) PCT Filed: Mar. 12, 2008

(86) PCT No.: PCT/JP2008/054527
§ 371 (c)(1),
(2), (4) Date: Sep. 14, 2009

(87) PCT Pub. No.: WO2008/114664
PCT Pub. Date: Sep. 25, 2008

(65) Prior Publication Data
US 2010/0047659 A1    Feb. 25, 2010

(30) Foreign Application Priority Data

Mar. 16, 2007 (JP) ................................. 2007-069493
Jul. 25, 2007 (JP) ................................. 2007-193697
Dec. 28, 2007 (JP) ................................. 2007-340452

(51) Int. Cl.
*H01M 8/10* (2006.01)
*C09D 183/06* (2006.01)

(52) U.S. Cl. ...... 429/492; 429/493; 429/535; 106/287.1; 106/287.16

(58) Field of Classification Search .................. 429/492, 429/493, 535; 106/287.1, 287.16
See application file for complete search history.

(56) References Cited

U.S. PATENT DOCUMENTS 5,795,496 A    8/1998    Yen et al.
7,214,756 B2   5/2007    Nomura et al.
(Continued)

FOREIGN PATENT DOCUMENTS

CN    1537340 A    10/2004
(Continued)

OTHER PUBLICATIONS

Chinese Office Action issued in Chinese Patent Application No. 200880004783.3, dated Jul. 28, 2011.
(Continued)

*Primary Examiner* — Stephen J. Kalafut
(74) *Attorney, Agent, or Firm* — Sughrue Mion, PLLC

(57) ABSTRACT

A membrane-electrode junction agent, a proton conducting membrane having a junction layer, a membrane-electrode assembly, a polymer electrolyte fuel cell, and a manufacturing method of the membrane-electrode assembly, which enhance the power generation performance, realize the high fuel barrier property, and are capable of enhancing the joint strength between the membrane and the electrodes, is provided. A membrane-electrode junction agent that joins a proton conducting membrane and electrodes arranged on both surfaces of the proton conducting membrane to each other, the membrane-electrode junction agent including: a crosslinked compound (X) having a silicon-oxygen bond; a polymer material (Y) containing an acid group; and a hydrophilic resin (Z) containing no acid group.

21 Claims, 1 Drawing Sheet

U.S. PATENT DOCUMENTS

| | | | |
|---|---|---|---|
| 7,482,403 B2 * | 1/2009 | Meguriya et al. | 429/492 X |
| 2004/0053113 A1 | 3/2004 | Nishikawa et al. | |

FOREIGN PATENT DOCUMENTS

| | | | |
|---|---|---|---|
| EP | 1427043 A1 | 6/2004 | |
| JP | 3578307 B2 | 7/2004 | |
| JP | 2005-079059 A | 3/2005 | |
| JP | 3679104 B2 | 5/2005 | |
| JP | 2006-049023 A | 2/2006 | |
| JP | 2006-054176 A | 2/2006 | |
| JP | 2007-048655 A | 2/2007 | |
| JP | 2007-063532 A | 3/2007 | |
| JP | 2007-063533 A | 3/2007 | |
| JP | 3927601 B2 | 6/2007 | |
| WO | 03/026051 A1 | 3/2003 | |

OTHER PUBLICATIONS

International Preliminary Report on Patentability (Chapter I) dated Oct. 1, 2009 in corresponding International Application No. PCT/JP2008/054527.

European Search Report corresponding to European Patent Application No. 08721943.2, dated Jul. 9, 2010.

Korean Office Action corresponding to Korean Patent Application No. 9-5-2011-027289264, dated May 2011.

* cited by examiner

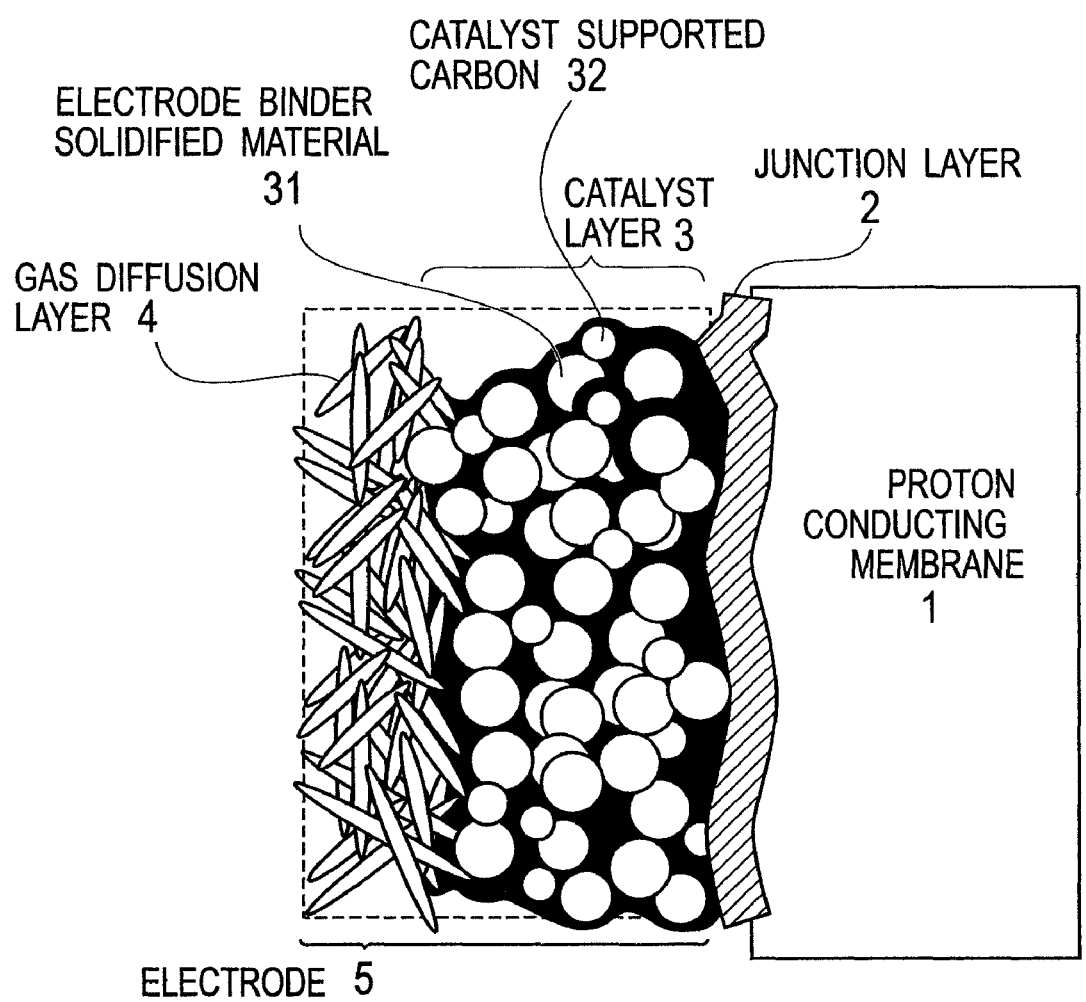

MEMBRANE-ELECTRODE JUNCTION AGENT, PROTON CONDUCTING MEMBRANE HAVING JUNCTION LAYER, MEMBRANE-ELECTRODE ASSEMBLY, POLYMER ELECTROLYTE FUEL CELL, AND MANUFACTURING METHOD OF THE MEMBRANE-ELECTRODE ASSEMBLY

TECHNICAL FIELD

The present invention relates to a membrane-electrode junction agent, a proton conducting membrane having a junction layer, a membrane-electrode assembly, a polymer electrolyte fuel cell, and a manufacturing method of the membrane-electrode assembly.

BACKGROUND ART

Fuel cells are classified into a phosphoric acid one, a molten carbonate one, a solid oxide one, a polymer electrolyte one and the like based on types of electrolytes composing the fuel cells. Among them, with regard to the polymer electrolyte fuel cell (hereinafter, referred to as a "PEFC"), a device thereof is small and an output thereof is high in comparison with the fuel cells of the other modes. Accordingly, the PEFC is placed as a system that plays a dominant role in the next generation. The PEFC is expected to serve as a fuel cell for small-scale on-site power generation, for a power source of a movable body such as a vehicle, for a portable instrument, or for the like.

In a basic structure of the PEFC, gas diffusion electrodes on which a catalyst such as platinum is supported are arranged on both sides of a proton (hydrogen ion) conducting membrane, and a pair of separators having a structure to supply a fuel are arranged further on both outsides of the arranged gas diffusion electrodes. This basic structure is taken as a unit cell, and a plurality of the cells adjacent to one another are coupled to one another, whereby it becomes possible to take out a desired power. For example, when hydrogen is supplied as the fuel from one side (generally referred to as an anode or a fuel electrode) of such an assembly, a reaction of $H_2 \rightarrow 2H^+ + 2e^-$ occurs on the fuel electrode side by the catalyst, and protons and electrons are generated. Here, the protons are supplied to an opposite electrode (generally referred to as a cathode, an air electrode or an oxygen electrode) side through the electrolyte membrane (referred also to a proton conducting membrane) in contact with electrodes of the fuel electrode and air electrode sides. Moreover, the electrons are collected at the electrode on the fuel electrode side, are used as electricity, and are thereafter supplied to the air electrode side. Meanwhile, the air electrode (oxygen electrode) side receives air (oxygen) supplied thereto, the protons which have passed through the proton conducting membrane, and the electrons used as the electricity, and a reaction of $½O_2 + 2H^+ + 2e^- \rightarrow H_2O$ occurs in the presence of the catalyst.

As described above, chemical reactions under the fuel cell operation occur on interface portions between the proton conducting membrane and the gas diffusion electrodes on which the catalyst is supported, and accordingly, interface structures of the membrane, the electrode and the catalyst largely affect performance of the fuel cell, which is such as power generation efficiency. The assembly of the proton conducting membrane and the gas diffusion electrodes is generally referred to as a membrane-electrode assembly (MEA), and has become one of major technology development fields of the fuel cell.

In the MEA, it is necessary that the membrane, the catalyst and the electrodes are coupled to one another while having appropriate interfaces thereamong. Specifically, when the fuel electrode side is taken as an example, it is necessary that the hydrogen or the like as the fuel can contact a catalyst surface, and that the protons and the electrons, which are generated from the hydrogen, are efficiently delivered individually to the membrane and the electrodes. At present, the one used most normally as the proton conducting membrane for the fuel cell is sulfonated fluorine resin (representative example: trade name "Nafion®" made by Du Pont Corporation) having thermoplasticity.

However, the sulfonated fluorine resin having the thermoplasticity has a problem of being short of heat resistance at the time of operating the polymer electrolyte fuel cell. Specifically, the sulfonated fluorine resin exerts proton conductivity in such a manner that ion channels are formed therein by coagulation of sulfone groups; however, the sulfonated fluorine resin has a defect of being plastically deformed at a specific temperature or more because of having the thermoplasticity, resulting in the breakage of an ion channel structure. Therefore, in the sulfonated fluorine resin, the plastic deformation occurs in a short time at approximately 130° C. of a glass transition temperature (Tg) or more, and gradually occurs even in a temperature range from 100 to 130° C., and ion conductivity is lowered, whereby it is difficult to maintain high fuel barrier property.

Moreover, in recent years, there have also been examined fuel cells, each using such as alcohol, ether and hydrocarbon, which is other than the hydrogen, as a fuel of the fuel cell, and taking out the protons and the electrons from the fuel other than the hydrogen by the catalyst. A representative example of the fuel cells as described above is a direct methanol fuel cell (DMFC) using methanol (in usual, used as an aqueous solution) as the fuel. The DMFC does not require an external reformer, and easily handles the fuel, and accordingly, is expected most as a small and portable power supply among various types of the fuel cells.

However, the above-mentioned sulfonated fluorine resin membrane has extremely high affinity with the methanol, and accordingly, has had a serious problem that the sulfonated fluorine resin concerned largely swells by absorbing the methanol, causes a so-called methanol crossover in which the methanol permeates the swelled proton conducting membrane to then leak out to the cathode side, resulting in that the output of the fuel cell is largely lowered.

Meanwhile, also with regard to electrolyte membranes for the fuel cell, which are made of other than the sulfonated fluorine resin, various types of membranes and the like, which are of hydrocarbon series, inorganic series and the like, are developed actively. For example, an organic silicon compound is composed of a silicon-oxygen bond having strong bonding energy, and accordingly, has high chemical stability, high heat resistance and high oxidation resistance, and can impart many exceptional properties depending on a composition thereof. Therefore, the organic silicon compound is used in every industrial field such as electricity, electronics, business machines, construction, food, health care, textile, plastic, paper, pulp, paint and rubber.

A proton conducting membrane is disclosed, which uses the organic silicon compound and has a cross-linked structure composed of the silicon-oxygen bond (for example, refer to Patent Literature 1). Even in the case of being exposed to a high-temperature and high-humidity environment under strong acidic conditions (where the protons are present) as in the proton conducting membrane, the cross-linked structure composed of the silicon-oxygen bond is relatively stable, and can be suitably used as a cross-linked structure inside of the fuel cell membrane. Moreover, even in the case of using the alcohol such as the methanol, the swelling is suppressed to be small by the silicon-oxygen cross-linked structure, and the methanol crossover can be expected to be reduced.

However, in the case of attempting to fabricate a membrane-electrode assembly by using the proton conducting membrane having the silicon-oxygen cross-linked structure as described above, there has been a problem that it is difficult to join the proton conducting membrane concerned to the electrodes by hot press like the sulfonated fluorine resin membrane heretofore used in general. Moreover, constituent components of the organic silicon compound membrane largely differ from constituent components of each of the thermoplastic resin electrodes, such as a Nafion electrode using Nafion® resin for an electrode binder solidified matter. Accordingly, in the case where the organic silicon compound membrane and the thermoplastic resin electrode are adhered to each other, adhesion strength between the membrane and the electrode has sometimes been weakened (for example, refer to Patent Literature 2). The problems as described above, the former problem in particular, occur also in the case of using, as the membrane, a proton conducting membrane having another cross-linked structure (for example, refer to Patent Literatures 3 and 4).

Moreover, in the proton conducting membrane having the silicon-oxygen cross-linked structure, intermolecular force of a silicon-carbon bond in the membrane to the peripheries thereof is somewhat weaker than that of the silicon-oxygen bond, and impact resistance of this proton conducting membrane to an external pressure derived from a humidity change, sudden swelling and the like is sometimes low. Therefore, for example, in the case of using a certain type of the organic silicon compound as a material of the membrane-electrode assembly for which high proton conductivity under high and low temperature conditions is required, performance deterioration in the proton conductivity and the fuel barrier property, which is caused by temperature variations, sometimes occurs. In this connection, an MEA using a membrane having high impact resistance while having the cross-linked structure has been required.

(Cited Literatures)
Patent Literature 1: Japanese Patent No. 3679104
Patent Literature 2: International Publication WO03/026051
Patent Literature 3: Japanese Patent No. 3578307
Patent Literature 4: Japanese Patent No. 3927601

DISCLOSURE OF THE INVENTION

Problems to be Solved by the Invention

It is an object of the present invention to provide a membrane-electrode junction agent, a proton conducting membrane having a junction layer, a membrane-electrode assembly, a polymer electrolyte fuel cell, and a manufacturing method of the membrane-electrode assembly, which enhance the power generation performance, realize the high fuel barrier property, and are capable of enhancing the joint strength between the membrane and the electrodes.

Means for Solving the Problems

In accordance with an aspect of the present invention, provided is a membrane-electrode junction agent that joins a proton conducting membrane and electrodes arranged on both surfaces of the proton conducting membrane to each other, the membrane-electrode junction agent including: a cross linkable compound (X) having a silicon-oxygen bond; and a polymer material (Y) containing an acid group.

Moreover, in accordance with the aspect of the present invention, provided is a membrane-electrode junction agent that joins a proton conducting membrane and electrodes arranged on both surfaces of the proton conducting membrane to each other, the membrane-electrode junction agent including: a cross linkable compound (X) having a silicon-oxygen bond; a polymer material (Y) containing an acid group; and a hydrophilic resin (Z) containing no acid group.

The membrane-electrode junction agent according to the present invention is arranged between the proton conducting membrane and the electrodes joined to both surfaces of the proton conducting membrane. In such a way, in comparison with the case where the membrane and the electrodes were directly joined to one another, the joint strength between the membrane and the electrodes is enhanced, and the membrane-electrode junction layers become less likely to be softened and swelled in an operation at a high temperature, in which high-concentration methanol is used. Accordingly, a high output can be maintained for a long time.

Note that, preferably, the membrane-electrode junction agent according to the present invention, a polymer material (Y) is a composite of a monomer (V) containing the acid group and a monomer (W) not containing the acid group and containing silicon. Moreover, the polymer material (Y) may contain an acid group-containing polymer obtained by polymerizing a monomer (V') having the acid group and a polymerizable unsaturated double bond. It is preferable that the acid group be any of a sulfonic acid group, a carboxylic acid group and a phosphoric acid group.

Moreover, it is preferable that the cross linkable compound (X) having the silicon-oxygen bond contains an aqueous solution of silica and/or silicate. Furthermore, it is preferable that the cross linkable compound (X) having the silicon-oxygen bond contains liquid alkoxysilane, and the aqueous solution of the silica and/or the silicate.

Furthermore, it is preferable that the hydrophilic resin (Z) containing no acid group is either polyvinyl alcohol or polyethylene glycol.

Moreover, in accordance with the aspect of the present invention, provided is a proton conducting membrane having a junction layer, in which the junction layer formed a membrane-electrode junction agent containing a cross linkable compound (X) having a silicon-oxygen bond and a polymer material (Y) containing an acid group is provided on one surface or both surfaces of the proton conducting membrane; or further, provided is a proton conducting membrane having a junction layer, in which the junction layer formed of a membrane-electrode junction agent that contains hydrophilic resin (Z) containing no acid group is provided on one surface or both surfaces of the proton conducting membrane; or provided is a membrane-electrode assembly in which a fuel electrode and an air electrode are arranged on both surfaces of the proton conducting membrane having the junction layer.

In the above-described proton conducting membrane having the junction layer or the membrane-electrode assembly, it is preferable that the cross linkable compound (X) and the polymer material (Y) are bonded to each other by a silicon-oxygen bond. Moreover, the junction layer may be composed of a continuum of particles, and in addition, the acid group may be imparted to surfaces of the particles, and proton conduction paths may be formed in gaps among the particles.

At this time, it is preferable that an average particle diameter of the particles is 3 to 200 nm.

Preferably, the proton conducting membrane has a cross-linked structure. More preferably, the proton conducting membrane is a proton conducting membrane including: an acid group-containing structure (H); and a silicon-oxygen bonding structure (A) containing a cross-linked structure by the silicon-oxygen bond, wherein the silicon-oxygen bonding structure (A) is a structure represented by a following general formula (I):

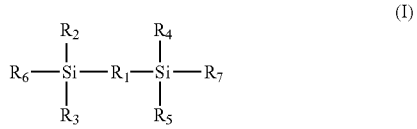

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_2$, $R_3$ and $R_6$ is O—Si concerned with the cross-link, and at least one of $R_4$, $R_5$ and $R_7$ is O—Si concerned with the cross-link).

Alternatively, the proton conducting membrane may be a proton conducting membrane, in which the silicon-oxygen bonding structure (A) containing the cross-linked structure by the silicon-oxygen bond and an acid group-containing structure (B) that is covalently bonded to a silane compound and has an acid group are coupled to each other by the silicon-oxygen bond, wherein the silicon-oxygen bonding structure (A) is a structure represented by a following general formula (I):

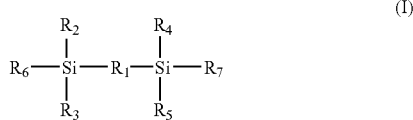

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_2$, $R_3$ and $R_6$ is O—Si concerned with the cross-link, and at least one of $R_4$, $R_5$ and $R_7$ is O—Si concerned with the cross-link).

Moreover, the proton conducting membrane may be a proton conducting membrane, in which the silicon-oxygen bonding structure (A) containing the cross-linked structure by the silicon-oxygen bond and the acid group-containing structure (B) that is covalently bonded to the silane compound and has the acid group are coupled to each other by the silicon-oxygen bond, wherein the silicon-oxygen bonding structure (A) is a structure represented by the following general formula (I):

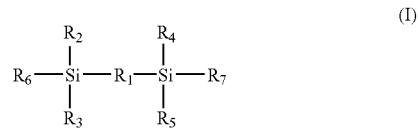

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_2$, $R_3$ and $R_6$ is O—Si concerned with the cross-link, and at least one of $R_4$, $R_5$ and $R_7$ is O—Si concerned with the cross-link), wherein a structure in which a silane compound (α) having the polymerizable unsaturated double bond and an acid group-containing compound (β) having the acid group and the polymerizable unsaturated double bond are covalently bonded to each other may be contained in the acid group-containing structure (B).

In accordance with another aspect of the present invention, a polymer electrolyte fuel cell composed by using the above-mentioned membrane-electrode assembly is provided. As an example, a mode in which a pair of separators which serve as passages of fuel and air (oxygen) are arranged on outsides of the membrane-electrode assembly is mentioned.

Moreover, in accordance with another aspect of the present invention, provided is a polymer electrolyte fuel cell, in which the above-mentioned membrane-electrode assembly is taken as a unit cell, the pair of separators which serve as the passages of the fuel and the air are arranged on outsides of the unit cell, and a plurality of the unit cells adjacent to one another are coupled to one another.

Furthermore, provided is a manufacturing method of a membrane-electrode assembly, which includes the steps of: forming a membrane having a junction layer by coating the above-mentioned membrane-electrode junction agent on both surfaces of a proton conducting membrane, followed by drying; softening and/or swelling the membrane having the junction layer by impregnating a polar solvent into the membrane having the junction layer; and pasting a fuel electrode and an air electrode to the softened and/or swelled membrane having the junction layer, followed by heat pressing.

BRIEF DESCRIPTION OF THE DRAWINGS

FIG. 1 is a schematic view showing a membrane-electrode assembly according to an embodiment of the present invention. Reference numerals in FIG. 1 denote as follows: 1 for a proton conducting membrane; 2 for a junction layer; 3 for a catalyst layer; 31 for an electrode binder solidified matter; 32 for catalyst supported carbon; 4 for a gas diffusion layer; and 5 for an electrode.

BEST MODE FOR CARRYING OUT THE INVENTION

Next, a description will be made of an embodiment of the present invention with reference to the drawing. In the following description with reference to the drawing, the same or similar reference numerals are assigned to the same or similar portions. However, the drawing is schematic, and it should be noted that a ratio of the respective dimensions, and the like are different from that of the actual ones. Hence, specific dimensions and the like should be determined from taking the following description into consideration. Moreover, it is a matter of course that portions different in dimensional relationship and ratio are also included among the drawings.

<Membrane-Electrode Assembly>

A membrane-electrode assembly according to the embodiment of the present invention includes junction layers formed of a membrane-electrode junction agent to be described later, and thereby can enhance joint strength, proton conductivity and fuel resistance in comparison with the conventional membrane-electrode assembly.

A manufacturing method of the membrane-electrode assembly is a method, in which the membrane-electrode junction agent according to the present invention is interposed between a proton conducting membrane fabricated in advance and each of electrodes fabricated in advance, and the proton conducting membrane and the electrode are joined to each other. The membrane-electrode assembly obtained by this method includes the proton conducting membrane, the electrodes arranged on both surfaces of the proton conducting membrane, and the junction layers, each of which is interposed between the proton conducting membrane and the electrode, and joins both thereof to each other, in which each of the junction layers contains the membrane-electrode junction agent according to the present invention.

As illustrated in FIG. 1, the membrane-electrode assembly according to the embodiment includes the proton conducting membrane 1, the junction layers 2 arranged on the surfaces of the proton conducting membrane 1, and the electrodes 5 joined to the proton conducting membrane 1 while interposing the junction layers 2 therebetween. As each of the electrodes 5, a Nafion® electrode using commercially available Nafion resin for an electrode binder solidified matter, and the like can be used though no particular limitations are imposed thereon. The electrode 5 has a gas diffusion layer 4 and a catalyst layer 3. The catalyst layer 3 is a layer composed, for example, of the electrode binder solidified matter 31, and the support (catalyst supported carbon) 32 such as carbon on which a catalyst such as platinum is supported.

It is preferable that the gas diffusion layer 4 be made water-repellent. In particular, the cathode-side electrode sometimes causes flooding by generated water; however, the gas diffusion layer 4 is made water-repellent, whereby the generated water can be eliminated, and an occurrence of the flooding can be suppressed effectively. Moreover, a conductive intermediate layer may be provided on a surface of the gas diffusion layer 4. The conductive intermediate layer is provided, whereby the catalyst layer and the gas diffusion layer are strongly adhered to each other, and in such a way, a gas diffusion electrode having high durability is obtained. As the conductive intermediate layer, a mixture of polytetrafluoroethylene (PTFE) as a water-repellent material and carbon black as an electron medium is preferable. In this case, a mixing ratio of the carbon black and the polytetrafluoroethylene (PTFE) is preferably 3:7 to 7:3, more preferably 5:5 in a weight ratio. An upper limit of a thickness of the conductive intermediate layer is preferably 0.1 mm. When the thickness of the conductive intermediate layer exceeds 0.1 mm, a resistance value thereof is increased to sometimes result in lowering of an output. Moreover, as the carbon black, the one in which a specific surface area is 10 $m^2/g$ or more can be suitably used.

The junction layer 2 is arranged between the proton conducting membrane 1 and the electrode 5, and thereby plays a role of enhancing the joint strength between the proton conducting membrane 1 and the electrode 5. The junction layer 2 is formed of the membrane-electrode junction agent to be described later. Details of the junction layer will be described later.

As the proton conducting membrane 1, for example, mentioned are: sulfonated fluorine resin such as a Nafion® membrane; the one in which a sulfonic acid group or a phosphoric acid group is introduced into so-called engineering plastics having an aromatic ring in a principal chain; silica glass doped with acid; an organic/inorganic composite membrane doped with acid; and the like. In particular, in this embodiment, membranes having the cross-linked structures shown in the above-mentioned Patent Literatures 3 and 4 and a membrane having the silicon-oxygen cross-linked structure shown in Patent Literature 1 are suitably used. Specifically, a proton conducting membrane including an acid group-containing structure (H) to be described later and a silicon-oxygen bonding structure (A) containing a cross-linked structure by a silicon-oxygen bond is preferable. More preferably, a proton conducting membrane is suitably used, in which the silicon-oxygen bonding structure (A) containing the cross-linked structure by the silicon-oxygen bond to be described later and an acid group-containing structure (B) that is covalently bonded to a silane compound and has an acid group are coupled to each other by the silicon-oxygen bond.

In accordance with the membrane-electrode assembly according to the embodiment of the present invention, the membrane-electrode junction agent and/or a cured body thereof is contained in the membrane-electrode assembly, whereby the joint strength between the membrane and the electrode can be enhanced without increasing resistance between the membrane and the electrode, and accordingly, it becomes possible to enhance the power generation performance.

Moreover, in the embodiment of the present invention, a proton conducting membrane fabricated in advance is sometimes used; however, this electrolyte membrane does not have to be completed (cured) perfectly. In this case, a chemical bond can be formed between an unreacted functional group of the membrane and a functional group in the junction agent, and further enhancement of the adhesion strength can be expected.

<Junction Agent>

The membrane-electrode junction agent for use in this embodiment is obtained by mixing a cross linkable compound (X) having the silicon-oxygen bond and a polymer material (Y) containing an acid group with each other. More preferably, the membrane-electrode junction agent for use in this embodiment is a membrane-electrode junction agent obtained by mixing the cross linkable compound (X) having the silicon-oxygen bond, the polymer material (Y) containing the acid group, and hydrophilic resin (Z) containing no acid group with one another.

(I) Cross linkable compound (X)

The cross linkable compound (X) is heated under the presence of water and a catalyst, or is heated after being neutralized by acid, and thereby forms a three-dimensional cross-linked structure made by the silicon-oxygen bond. Accordingly, the cross linkable compound (X) can maintain a relatively stable shape even in the case of being exposed to a high-temperature and high-humidity environment under strong acidic conditions and in the case of using, as fuel, alcohol such as methanol. Moreover, depending on such a case where the electrolyte membrane containing the cross linkable compound is not completed (cured) completely, the cross linkable compound in the proton conducting membrane 1 shown in FIG. 1 and the cross linkable compound in the junction layer 2 shown in FIG. 1 interact with each other or are coupled to each other, whereby an integrated assembly free from a seam can also be formed from the membrane to the electrode.

What can be preferably used as the cross linkable compound (X) is, for example, bis(triethoxysilyl)methane, 1,2-bis(trimethoxysilyl)ethane, 1,2-bis(triethoxysilyl)ethane, 1,6-bis(triethoxysilyl)hexane, 1,8-bis(triethoxysilyl)octane, 1,8-bis(diethoxymethylsilyl)octane, 1,8-bis(ethyldimethoxysilyl)octane, 1,9-bis(triethoxysilyl)nonane, 1,4-bis(triethoxysilyl)benzene, 1,4-bis(trimethoxysilylmethyl)benzene, bis(trimethoxysilylethyl)benzene, alkoxysilanes such as tetramethoxysilane, tetraethoxysilane, tetraisopropoxysilane, tetrabutoxysilane, methyltrimethoxysilane, methyltriethoxysilane, ethyltrimethoxysilane, ethyltriethoxysilane, phenyltrimethoxysilane, phenyltriethoxysilane, dimethyldimethoxysilane, dimethyldiethoxysilane, n-propyltrimethoxysilane, i-propyltrimethoxysilane and n-buthyltrimethoxysilane, silica, silica compounds such as potassium silicate and sodium silicate, and the like.

It is preferable that the cross linkable compound (X) having the silicon-oxygen bond contains an aqueous solution of silica and/or silicate. The aqueous solution of the silica and/or the silicate, which has good compatibility with the polymer material (Y) containing the acid group to be described later and with the hydrophilic resin (Z) containing no acid group, is allowed to coexist with the polymer material (Y) and the hydrophilic resin (Z). In such a way, the entirety of the junction layer can be imparted more uniformly with enhancement of water resistance and swelling resistance, which are expected to the cross linkable compound having the silicon-oxygen bond.

Moreover, it is preferable that the cross linkable compound (X) having the silicon-oxygen bond contains liquid alkoxysilane and the aqueous solution of the silica and/or the silicate. Even if each of the alkoxysilane and the aqueous solution of the silica and/or the silicate is singly contained in the membrane-electrode junction agent, each thereof exerts an effect of enhancing adhesiveness. However, before the alkoxysilane is subjected to hydrolysis, compatibility of the alkoxysilane with the polymer material (Y) containing the acid group and the hydrophilic resin (Z) containing no acid group is sometimes a little poor. In this connection, the aqueous solution of the silica and/or the silicate, which has good compatibility with the polymer material (Y) and the hydrophilic resin (Z), is allowed to coexist therewith, whereby the entirety of the junction layer can be imparted more uniformly with the enhancement of the water resistance and the swelling resistance, which are expected to the cross linkable compound having the silicon-oxygen bond. Moreover, when the alkoxysilane is hydrolyzed and polycondensed by being heated under the presence of the water and the catalyst, and so on, the alkoxysilane is conceived to form cross-linked points also with the silica and/or the silicate, which is uniformly dispersed. Accordingly, the water resistance and the swelling resistance can be further enhanced, and a membrane-electrode assembly that has higher adhesiveness can be formed.

As the silica and/or the silicate, suitably can be used: the one in which the potassium silicate or the sodium silicate is neutralized by the acid; and the one from which metal ions are removed in such a manner that the matter concerned is transmitted through ion exchange resin. Moreover, alkoxy titanium, alkoxy aluminum, phosphoric acid and/or phosphate, tungstic acid and the like, which can form the cross-linked points with the alkoxysilane or the silica and/or the silicate, may be further allowed to coexist with the polymer material (Y) and the hydrophilic resin (Z).

Moreover, as the cross linkable compound (X), alkoxysilane, which has an organic group that can react with functional groups of the polymer material (Y) containing the acid group to be described later and of the hydrophilic resin (Z) containing no acid group, can be used. As such alkoxysilane, for example, mentioned are 2-(3,4-epoxycyclohexyl)ethyltrimethoxysilane, 3-(2-aminoethylamino)propyltriethoxysilane, 3-(2-aminoethylamino)propyltrimethoxysilane, isocyanic acid 3-(triethoxysilyl)propyl, 3-aminopropyltriethoxysilane, 3-aminopropyltrimethoxysilane, 3-glycidyloxypropyltrimethoxysilane, and the like.

(II) Polymer Material (Y) Containing Acid Group

The polymer material (Y) containing the acid group is a polymer material that contains the acid group such as the sulfonic acid group (sulfo group), the carboxylic acid group (carboxyl group), the phosphoric acid group, a phosphonic acid group, and a phosphinic acid group. As the polymer material (Y), for example, mentioned are polymers obtained by polymerizing monomers such as vinyl sulfonic acid, allyl sulfonic acid, 2-acrylamide-2-methylpropane sulfonic acid, styrene sulfonic acid, 2-(methacryloyloxy)ethylsulfonic acid, 3-sulfopropyl methacrylate, 4,4'-diaminostilbenzene-2, 2'-disulfonic acid, itaconic acid bis-(3-sulfopropyl), acrylic acid and methacrylic acid, polymers obtained by polymerizing vinyl phosphoric acid, allyl phosphoric acid and the like, and polyphosphoric acid. Moreover, if plural types of these monomers are copolymerized, then polymer materials which have a plurality of different acid groups in one molecule are obtained, and these can also be suitably used as the polymer material (Y). As these polymer materials, for example, mentioned are a vinyl sulfonic acid-acrylic acid copolymer, 2-acrylamide-2-methylpropane sulfonic acid-acrylic acid copolymer, a 2-acrylamide-2-methylpropane sulfonic acid-vinyl phosphoric acid copolymer, and the like.

Moreover, the polymer material (Y) may further contain a monomer unit that has a functional group capable of being bonded to the monomer that forms the polymer material (Y) and does not contain the acid group, or may further contain a cross-linking agent that has a plurality of functional groups capable of being bonded to the polymer material (Y) or the monomer that forms the polymer material (Y). As the former monomer unit, for example, methyl(metha)acrylate, ethyl (metha)acrylate, (metha)acrylamide, styrene and the like can be suitably used. As the latter cross-linking agent, for example, N,N'-methylene bis(acrylamide), neopentyl glycol diacrylate, 1,4-bis(acryloyloxy)butane, 1,3-bis(methacryloyloxy)-2-propanol, trimethylolpropane triacrylate, trimethylolpropane trimethacrylate, 1-(acryloyloxy)-3-(methacryloyloxy)-2-propanol, divinylbenzene, 3-(methacryloylamino)propyl trimethyl ammonium chloride, vinyl methacrylate and the like can be suitably used.

Furthermore, the polymer material (Y) may further contain a hydrophilic group in addition to the acid group. Here, as the hydrophilic group, mentioned are a hydroxyl group, an amino group, an amide group, an oxo group, a carbonyl group, a formyl group, a nitro group, a mercapto group and the like. The hydroxyl group, the amino group and the amide group are used more suitably. As the polymer material containing the acid group and the hydrophilic group, for example, mentioned are a vinyl sulfonic acid-vinyl alcohol copolymer, a 2-acrylamide-2-methylpropane sulfonic acid-vinyl alcohol copolymer and the like. As described above, the polymer material (Y) containing the acid group further contains the hydrophilic group, whereby the membrane-electrode adhesiveness and the water resistance and polar solvent resistance of the junction layer are enhanced.

The acid group is contained at a high concentration in the polymer material (Y), whereby the proton conductivity is enhanced, and a high fuel cell output can be obtained; however, in usual, it is apprehended that dissolution and swelling may occur, for example, by the methanol and the like. However, in the present invention, the polymer material (Y) is allowed to coexist with the cross linkable compound (X), whereby a strong cross link is formed, the dissolution and the swelling, which are caused by the methanol and the like, are less likely to occur, and a state where the acid group is present at a high concentration in junction layers $2a$ and $2b$ shown in FIG. 1 can be ensured. Accordingly, the operation of the fuel cell, in which the output is high and stable for a long time, can be achieved.

Note that the polymer material (Y) may be a composite of a monomer (V) containing the acid group and a monomer (W) not containing the acid group and containing the silicon. What can be suitably used as the monomer (V) containing the acid group is vinyl sulfonic acid, allyl sulfonic acid, 2-acrylamide-2-methylpropane sulfonic acid, styrene sulfonic acid, 2-(methacryloyloxy)ethylsulfonic acid, 3-sulfopropyl methacrylate, 4,4'-diaminostilbenzene-2,2'-disulfonic acid, itaconic acid bis-(3-sulfopropyl), acrylic acid, methacrylic acid, vinyl phosphoric acid, allyl phosphoric acid, and the like. What can be suitably used as the monomer that does not contain the acid group but contains the silicon is 3-(trimethoxysilylpropyl acrylate, 3-(methyldimethoxysilyl)propyl acrylate, 3-(triethoxysilyl)propyl acrylate, 3-(methyldiethoxysilyl)propyl acrylate, trimethoxy vinyl silane, triethoxy vinyl silane, 3-(trimethoxysilyl)propyl methacrylate, 3-(methyldimethoxysilyl)propyl methacrylate, 3-(triethoxysilylpropyl methacrylate, 3-(methyldiethoxysilyl)propyl methacrylate, p-styryltrimethoxysilane, p-styryltriethoxysilane, and the like.

With such a configuration, the silicon-oxygen cross-linked structure can also be imparted to the polymer material (Y) itself, the dissolution and the swelling, which are caused by the methanol and the like, are prevented, and the high oxygen concentration is realized, and as a result, the fuel cell in which the output is high can be provided.

Moreover, the one obtained by polymerizing a monomer (V') having the acid group and a polymerizable unsaturated double bond can be suitably used. As the monomer (V'), the same compounds as those illustrated above as the monomer (V) can be used.

The compounds as described above are available at a relatively low price, and types thereof are also abundant. Moreover, the compounds cause a reaction of the polymerizable unsaturated double bond relatively easily, and accordingly, are easy to control, and from the compounds, a target structure can be obtained by a simple polymerization control device. Accordingly, the compounds can be suitably used.

Here, plural types of the polymer materials (Y) may be used. At this time, in addition to the above-mentioned polymers, an acid group-containing polymer material and an electrolyte material, which have the proton conductivity and are known in the technical field concerned, can also be used. These materials can be introduced mainly in order to enhance the proton conductivity.

For example, electrolyte materials as below are mentioned.

a) A composite compound composed of: an organic compound created by neutralizing at least one salt of silicic acid, tungstic acid, molybdic acid and stannic acid by acid in a raw material solution in which organic compounds containing organic polymers having the hydroxyl groups coexist, or neutralizing zirconium halide or zirconium oxyhalide by alkali therein, followed by removal of a solvent; at least one inorganic compound among a silicate compound, a tungstate compound, a molybdate compound, a stannate compound and a zirconate compound; and water.

b) As an aromatic polymer compound having the proton conductivity, for example, mentioned are: those in which acid groups such as the sulfonic acid group (sulfo group), the carboxylic acid group (carboxyl group), the phosphoric acid group, the phosphonic acid group, and the phosphinic acid group are introduced into polyetherketone, polyetheretherketone, polysulfone, polyethersulfone, polyetherethersulfone, poly(arylene ether), polyimide, polyphenylene, poly((4-phenoxybenzoyl)-1,4-phenylene), polyphenylene sulfide, polyphenylquinoxsalen and the like; sulfoarylated polybenzimidazole; sulfoalkylated polybenzimidazole; phosphoalkylated polybenzimidazole; phosphonated poly(phenylene ether); and the like.

c) A polymer in which the above-mentioned acid group is introduced into a block copolymer or a graft copolymer, which contains, as components, a polymer block containing, as a main repeating unit, an aromatic vinyl compound such as 4-tert-butylstyrene, a polymer block composed of styrene or α-methylstyrene, and a polymer block composed of conjugate diene.

d) A proton conducting material containing the above-mentioned acid group, and an aromatic polymer compound in which atoms in at least a part of aromatic units are substituted by fluorine atoms, wherein the aromatic polymer compound is polybenzoxazole (PBO), polybenzothiazole (PBT), polybenzoimidazole (PBI), polysulfone (PSU), polyethersulfone (PES), polyetherethersulfone (PEES), polyarylethersulfone (PAS), polyphenylenesulfone (PPSU), polyphenylene ether (PPE), denatured polyphenylene ether, polyphenylene sulfoxide (PPSO), polyphenylene sulfide (PPS), polyphenylene sulfide sulfone (PPS/SO2), polyparaphenylene (PPP), polyetheretherketone (PEEK), polyetherketoneketone (PEKK), polyimide (PI), polystyrene (PSt), syndiotactic polystyrene (s-PSt), and derivatives of these compounds, and copolymers of these compounds.

e) A polymer composition obtained by copolymerizing a monomer having the above-mentioned acid group and a monomer having a basic group, wherein the monomer having the acid group is acrylamide methyl propane sulfonic acid, styrene sulfonic acid, vinyl sulfonic acid, (meta)aryl sulfonic acid, acidphosphoxyethyl methacrylate, (metha)acrylic acid, maleic acid anhydride, and fumaric acid, and the monomer having the basic group is acrylamide, arylamine, vinyl pyrrolidone, vinyl imidazole, N-propylacrylamide, N-butylacrylamide, N-vinylformamide, vinyl pyridine, and dimethylaminoethyl(metha)acrylate.

f) Fullerenated polymer sulfonic acid composed in such a manner that polymers having the sulfonic acid group in aromatic rings are cross-linked together while interposing fullerene nuclei thereamong. For example, mentioned are polymers obtained by putting polymers such as polystyrene, polysulfone, polyvinylcarbazole and polycarbonate into fullerenes, followed by sulfonation.

(III) Hydrophilic Resin (Z) Containing No Acid Group

The hydrophilic resin (Z) containing no acid group is not particularly limited as long as it is a polymer material containing the hydrophilic group or a polymer material having a hydrophilic region in a principal chain of a polymer, and it is resin that has high affinity with water. As the hydrophilic group, mentioned are the hydroxyl group, the amino group, the amide group, a pyrrolidone group, the oxo group, the carbonyl group, the formyl group, the nitro group, the mercapto group and the like. The hydroxyl group, the amino group and the amide group are used more suitably. As the hydrophilic region contained in the principal chain of the polymer, an ether bond, an ester bond, an amide bond and the like are mentioned.

What can be suitably used as the hydrophilic resin (Z) containing no acid group is aqueous solutions of hydrophilic resins such as polyvinyl alcohol, polyacrylamide, polyvinyl pyrrolidone, polyoxyalkylene, polyethylene glycol and polyglycerol, and the like, in which molecular weights and degrees of saponification are various. Moreover, as a cross-linking agent that can cross-link these hydrophilic resins, dihydrazides, trihydrazides, dicarboxylic acids, tricarboxylic acids, diamines, triamines, dialdehydes, trialdehydes, diglycidyl ethers, triglycidyl ethers and the like may be used. Furthermore, polyacrylic acid, an acrylic acid-maleic acid copolymer, an acrylamide-acrylic acid hydrazide copolymer and the like can also be used as the cross-linking agent.

In particular, the polyvinyl alcohol easily forms the cross-link by the dicarboxylic acids, the tricarboxylic acids, the dialdehydes, the trialdehydes, the diglycidyl ethers, the triglycidyl ethers, alkoxysilane, alkoxytitanium, alkoxyaluminum, and the like, and is capable of enhancing the water resistance and the swelling resistance. Accordingly, the polyvinyl alcohol can be suitably used.

As the polyvinyl alcohol, the one with an average degree of polymerization, which suitably ranges from 1000 to 5000, more preferably ranges from 2000 to 3500, can be used. If the degree of polymerization is small, then the water resistance becomes poor, and the swelling, the dissolution and the like of the membrane/electrode interface occur when the fuel cell is used, and the lowering of the output occurs. If the degree of polymerization is too large, then a viscosity of the aqueous solution is too high to allow preparation of a sufficiently uniform solution together with the other materials. Moreover, the degree of saponification of the polyvinyl alcohol is preferably higher though is not particularly limited. The degree of saponification is preferably 90% or more, more preferably 98% or more. If the degree of saponification is high, then a layer with higher water resistance can be formed after the junction layer is formed by heat curing. Note that it is substantially difficult to obtain 99.99% or more of the degree of saponification, and even if this 99.99% or more is obtained, cost requires therefor becomes extremely high.

Moreover, the polyethylene glycol also has the hydroxyl group capable of being cross-linked by a variety of cross-linking agents, those with a variety of molecular weights are commercially available, and the polyethylene glycol can also be suitably used. An average molecular weight of the polyethylene glycol is preferably one million or more, particularly preferably two millions or more. If the polyethylene glycol with a high molecular weight is used, then a junction layer excellent in water resistance and swelling resistance can be formed.

These hydrophilic resins have the polar group, and accordingly, contribute to enhancement of adhesion force between the electrolyte membrane and the electrode. Moreover, plural types of these hydrophilic resins may be used in combination.

(IV) Other Additives

As an adhesive adjunct, inorganic powder such as silica powder, calcium powder, ceramic powder, talc and kaolin may be added into the membrane-electrode junction agent according to needs. As the silica powder, hollow silica particles (silica balloons), alkali-free glass and the like can be preferably used.

Moreover, a fluorine resin dispersion may be used as the additive. In a joined portion of the membrane-electrode assembly, high adhesiveness and high proton conductivity are required. In this case, if the fluorine resin dispersion is added, and the fluorine resin, the acid group-containing polymer and the hydrophilic polymer are uniformly mixed together by an ultrasonic homogenizer and the like, then the water resistance and the swelling resistance are enhanced by water repellency inherent in the fluorine resin, and a junction layer in which the adhesiveness is higher can be formed. As the fluorine resin dispersion, it is preferable to use a polytetrafluoroethylene (PTFE) dispersion. As the PTFE dispersion, 30J made by Du Pont-Mitsui Fluorochemicals Company, Ltd., D-1 and D-2, which are made by Daikin Industries, Ltd., AD-1 and AD639 made by Asahi Glass Co., Ltd., and the like are available as commercial items. As the PTFE dispersion, for example, mentioned is the one that contains, as main components, water that is a solvent, PTFE resin and surfactant, in which an average particle diameter of the fluorine resin approximately ranges from 0.1 to 0.8 micron. Here, the surfactant is nonionic surfactant containing polyoxyethylene alkyl phenyl ether or polyoxyalkylene alkyl ether. Moreover, the fluorine resin dispersion may be prepared from a monomer such as tetrafluoroethylene under the presence of appropriate solvent and surfactant in accordance with an emulsion polymerization method known in the technical field concerned.

Moreover, a cross-linking agent capable of cross-linking the above-mentioned hydrophilic resin such as the polyvinyl alcohol, and a plasticizer capable of plasticizing the same hydrophilic resin, can be added. As the cross-linking agent, mentioned are the dihydrazides/trihydrazides, the dicarboxylic acids/tricarboxylic acids, the diamines/triamines, the dialdehydes/trialdehydes, the diglycidyl ethers/triglycidyl ethers, and the like. As the plasticizer, mentioned are: the polyethylene glycol; polyethylene glycol methyl ether; polyethylene glycol diglycidyl ether; polyethylene glycol dimethacrylate; polyethylene glycol surfactants such as Tween 20®, Brij-35® and Triton X-100®; polyglycerol such as diglycerol and triglycerol, and derivatives of theses; and the like.

As more preferable examples of the cross-linking agent, mentioned are sulfosuccinic acid, glutaraldehyde, terephthalaldehyde, glycerol triglycidyl ether, glycerol propoxylate triglycidyl ether, and the like.

Moreover, as for a cross-linking agent, in the case where the alkoxysilane that has a reactive organic group is selected as the cross linkable compound (X), then a cross-linking agent is preferable, which has the same functional group as this reactive organic group, in which the number of the functional group is two or more in one molecule. For example, in the case where the 3-glycidyloxypropyltrimethoxysilane is selected as the cross linkable compound (X), the polyethylene glycol is selected as the hydrophilic resin (Z), and the glycerol propoxylate triglycidyl ether is selected as the cross-linking agent therebetween, then a junction layer in which the water resistance and the swelling resistance are higher can be formed, and can be suitably used.

In the case of adding the additive as described above, a loading thereof in a total amount is preferably 0.1 wt % to 50 wt %, more preferably 1 to 20 wt %, still more preferably 5 to 15 wt %. Though depending on the additive to be added, if an optimum range of the loading is the above-described range, then an effect by the additive tends to be favorably exerted while the obtained electrolyte material keeps on maintaining the high proton conductivity.

<Junction Layer>

The one, in which the above-mentioned junction agent is provided on the surface of the membrane or between the membrane and the electrode by a method to be described later, followed by drying and/or curing, is referred to as the junction layer. The junction layer may be the one, in which the junction agent is coated in a layer shape on the surface of the membrane, followed by drying. Depending on conditions, the junction layer takes any one form of a gel-like form, a semi-solid form and a completely solid form. The junction layer has functions to adhere the membrane and the electrode to each other in the membrane-electrode assembly and to conduct the protons therebetween. A method of forming the junction layer will be described later.

It is necessary that the junction layer strongly joins the membrane and the electrode to each other and has high proton conductivity. Therefore, it is necessary that the layer itself has high strength and cohesive force. Moreover, it is necessary that the junction layer be less likely to be dissolved by the water and the methanol, not be deformed or swell to an extreme, and not cause extreme deformation or softening by heat. These requirements can be achieved if the junction layer is formed of the junction agent of this patent.

The junction layer may be the one in which a uniform structure is formed after the materials which compose the junction agent are uniformly mixed together. More preferably, the junction layer should be an aggregate of particles which have the acid group on surfaces thereof, and proton passes should be formed among the particles. By taking such a structure, the junction layer allows efficient conduction of the protons. Here, the particles are preferably spherical; however, may be indefinite particles. The indefinite particles refer to particles which are not composed of perfect curved surfaces and have cornered spots in a part or the entirety thereof. An average particle diameter of the particles is preferably 3 nm to 200 nm, more preferably 10 nm to 100 nm. When the average particle diameter exceeds 200 nm, then a surface area of the particles in charge of the proton conduction is reduced, and it becomes impossible to obtain high conductivity, and moreover, a gap among the particles becomes too large, and the junction layer (aggregate) becomes fragile. Meanwhile, when the average particle diameter is 3 nm or less, the junction layer comes close to the uniform layer, and efficient proton conduction by using a smaller number of the acid groups becomes sometimes impossible. More preferably, the average particle diameter is 10 to 100 nm. By setting an average particle diameter range at the above-described range, proton conduction paths can be ensured sufficiently while ensuring sufficient strength. Although the particle diameters can be obtained directly from an electron microscope photograph, the particle diameters can also be obtained by means such as small-angle X-ray scattering. Moreover, with regard to a distribution of the particle diameters, the junction layer may be both a continuum of particles with a uniform particle diameter and a continuum of particles with nonuniform particle diameters. Here, if the particle diameter distribution of the particles is uniform, the gap is likely to be generated geometrically though depending on the particle diameter, and it is possible that the junction layer can exert high ion conductivity. Meanwhile, if the particle diameter distribution has a certain range, then dense packing is possible, and this contributes to the enhancement of the fuel barrier property and to the enhancement of the strength of the membrane. Hence, it is desirable to select the particle diameter distribution in response to a service situation. It is possible to control the particle diameter by adjusting conditions such as a structure and molecular weight of a raw material for use, type/concentration of the solvent, and a reaction temperature.

<Proton Conducting Membrane Having Junction Layer>

In the case of fabricating a second membrane-electrode assembly to be described later, the junction agent is coated on the surface of the membrane, followed by drying and/or curing, whereby a proton conducting membrane having the junction layer is formed. Then, after forming a membrane having the junction layer, it becomes possible to arrange the electrode on the junction layer by softening and/or swelling the junction layer by water or a polar solvent without adopting a method, in which a liquid junction agent is coated between the membrane and the electrode, the membrane and the electrode are thereby pasted to each other, followed by drying and/or curing. If this method is adopted, then there is an advantage that a degree of freedom in designing a pasting process is increased since a problem is eliminated from stability of the junction agent that has cross-linkage, that is, from a so-called pot life.

<Proton Conducting Membrane>

A description is made of an example of a proton conducting membrane suitable for the membrane-electrode assembly according to the embodiment of the present invention, which is described above. The proton conducting membrane according to the embodiment is not particularly limited as long as it is a proton conducting membrane having the cross-linked structure; however, for example, the following membranes can be preferably used, which are: 1) a proton conducting membrane (first proton conducting membrane) that contains the acid group-containing structure (H) and the silicon-oxygen-containing/bonding structure (A); 2) a proton conducting membrane (second proton conducting membrane) in which the silicon-oxygen bonding structure (A) and the acid group-containing structure (B) are coupled to each other by the silicon-oxygen bond; or 3) a membrane (third proton conducting membrane) according to the second membrane, in which the acid group-containing structure (B) is a structure in which a silane compound ($\alpha$) having the polymerizable unsaturated double bond and an acid group-containing compound ($\beta$) having the acid group and the polymerizable unsaturated double bond are covalently bonded to each other.

1) First Proton Conducting Membrane (V) Acid Group-Containing Structure (H)

At the time when the fuel cell is in operation, the protons generated in the anode are supplied to the membrane, and meanwhile, the protons in the membrane are consumed in the cathode. Some protons are present in advance in the proton conducting membrane. In the anode, a concentration of the protons is increased by being supplied with the protons, and in the cathode, a concentration of the protons is decreased by consuming the protons. A concentration gradient of the protons, which occurs in the membrane as described above, is a driving force for the proton diffusion from the anode to the cathode. In the case where the protons are not sufficiently present in the membrane, then the protons on the cathode side fall short, and the stable operation of the fuel cell cannot be desired. Hence, in order to provide a proton conducting membrane for the fuel cell, which exhibits a high output, it is necessary to form proton conduction paths, where the acid groups are present at a high concentration, and the acid groups are arranged continuously.

In the present invention, the acid group-containing structure (H) and the silicon-oxygen-containing/bonding structure (A) are provided, whereby a strong cross-link is formed, the dissolution and the swelling, which are caused by the methanol and the like, are less likely to occur, and a state where the acid group is present at a high concentration in the membrane can be ensured. In addition, it becomes possible to increase the concentration of the protons in the membrane. In such a way, a membrane capable of achieving the operation of the fuel cell, which is stable for a long time and has a high output, is obtained.

As the acid group-containing structure (H) related to the first proton conducting membrane, the same one as the polymer material (Y) containing the acid group can be used. Specifically, mentioned are the polymers obtained by polymerizing the monomers such as the vinyl sulfonic acid, the allyl sulfonic acid, the 2-acrylamide-2-methylpropane sulfonic acid, the styrene sulfonic acid, the 2-(methacryloyloxy) ethylsulfonic acid, the 3-sulfopropyl methacrylate, the 4,4'-diaminostilbenzene-2,2'-disulfonic acid, the itaconic acid bis-(3-sulfopropyl), the acrylic acid and the methacrylic acid. The polymers obtained by polymerizing the vinyl phosphoric acid, the allyl phosphoric acid and the like, and the polyphosphoric acid can also be used. Moreover, the acid group-containing structure (H) may further contain the monomer unit that has the functional group capable of being bonded to the monomer that forms the polymer material (Y) and does not contain the acid group, or may further contain the cross-linking agent that has the plurality of functional groups capable of being bonded to the polymer material (Y) or the monomer that forms the polymer material (Y). As the former monomer unit, for example, the methyl(metha)acrylate, the ethyl(metha)acrylate, the (metha)acrylamide, the styrene and the like can be suitably used. As the latter cross-linking agent, for example, the N,N'-methylene bis(acrylamide), the neopentyl glycol diacrylate, the 1,4-bis(acryloyloxy)butane, the 1,3-bis(methacryloyloxy)-2-propanol, the trimethylolpropane triacrylate, the trimethylolpropane trimethacrylate, the 1-(acryloyloxy)-3-(methacryloyloxy)-2-propanol, the divinylbenzene, the 3-(methacryloylamino)propyl trimethyl ammonium chloride, the vinyl methacrylate and the like can be suitably used.

(VI) Silicon-Oxygen Bonding Structure (A)

As the silicon-oxygen bonding structure (A), a structure represented by a general formula (I) is preferably used.

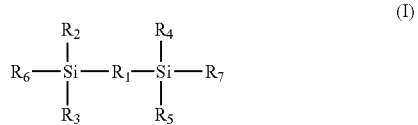

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_2$, $R_3$ and $R_6$ is O—Si concerned with the cross-link, and at least one of $R_4$, $R_5$ and $R_7$ is O—Si concerned with the cross-link).

As represented by the above-described general formula, the silicon-oxygen bonding structure (A) is sometimes composed only of the inorganic matters, or is sometimes composed of an organic/inorganic composite mixed with the organic compound. In the case where the organic compound is mixed into the silicon-oxygen bonding structure (A), a fuel cell membrane that combines heat resistance inherent in the inorganic matters and softness inherent in the organic matters can be formed. In the case where such a compound is provided, it is possible to adjust the respective properties of the membrane, which include the softness, by designing a molecular structure among the cross-linked structures. By adjusting the concentration of the acid group, the molecular structure and a cross-link density, it also becomes possible to control the proton conductivity and the fuel barrier property, which are important characteristics of the electrolyte membrane for the fuel cell.

Some of cross-linked precursors which form these structures are directly commercially available. Moreover, it is possible to synthesize the cross-linked precursor by a hydrosilylating reaction of a silyl compound corresponding thereto in the case where the unsaturated bond is provided, and it is possible to similarly synthesize the cross-linked precursor also in the case where the hydroxyl group, the amino group and the like are provided.

Here, when the carbon number of $R_1$ exceeds 50, the cross-link becomes insufficient, and it becomes impossible to expect the swelling resistance and the heat resistance. As a preferable form of $R_1$, a hydrocarbon compound is mentioned. The hydrocarbon compound has high acid resistance, and is extremely stable. As hydrocarbons, an alkylene chain, an aromatic-containing chain and the like are mentioned. Among them, a linear molecular chain composed of a polymethylene chain that does not have a branch or the like is particularly preferable. A compound of the linear polymethylene chain is stable against an attack by acid, radical and the like, and is a material that can be preferably used as the electrolyte membrane for the fuel cell. Moreover, this compound has not only the stability but also a structure in which the linear polymethylene chain is bendable, and accordingly, it is possible to impart appropriate softness to the membrane, and it is also possible to adjust denseness thereof. These adjustments are achieved mainly by a molecular length of the polymethylene chain. Furthermore, $R_1$ may have some heteroatoms. The ether bond, the ester bond, the amide bond and the like can be suitably used from viewpoints of easiness of forming the bond, the softness of the structure, and availability of the raw materials.

As the silicon-oxygen bonding structure (A), for example, cross-linked structures composed by performing the hydrolysis and the polycondensation for the following can be preferably used, which are: the bis(triethoxysilyl)methane; the 1,2-bis(trimethoxysilyl)ethane; the 1,2-bis(triethoxysilyl)ethane; the 1,6-bis(triethoxysilyl)hexane; the 1,8-bis(triethoxysilyl)octane; the 1,8-bis(diethoxymethylsilyl)octane; the 1,8-bis(ethyldimethoxysilyl)octane; the 1,9-bis(triethoxysilyl)nonane; the 1,4-bis(triethoxysilyl)benzene; the 1,4-bis(trimethoxysilylmethyl)benzene; the bis(trimethoxysilylethyl)benzene; and the alkoxysilanes such as the tetramethoxysilane, the tetraethoxysilane, the tetraisopropoxysilane, the tetrabutoxysilane, the methyltrimethoxysilane, the methyltriethoxysilane, the ethyltrimethoxysilane, the ethyltriethoxysilane, the phenyltrimethoxysilane, the phenyltriethoxysilane, the dimethyldimethoxysilane, the dimethyldiethoxysilane, the n-propyltrimethoxysilane, the i-propyltrimethoxysilane and the n-buthyltrimethoxysilane. The silicon-oxygen bonding structure (A) may be composed of one of these, which is taken as a raw material, or may be composed of two or more of them, which are taken as raw materials. Moreover, such alkoxy groups of the above-described compound do not have to cause a perfect reaction; however, the compound takes a denser structure when the alkoxy groups causes the perfect reaction to form O—Si, and this is preferable from viewpoints of the heat resistance, the fuel barrier property and the mechanical strength. Furthermore, those in which the alkoxy groups of the listed compounds are substituted by other alkoxy groups can also be used similarly. Moreover, the present invention is not limited to this.

By using the appropriate silicon-oxygen bonding structure (A), silica cross-linked particles can also be formed. By adjusting a cross-link density and inter-particle bonding strength of the silica cross-linked particles, the strength and flexibility of the proton conducting membrane can also be appropriately controlled.

In the case of using this membrane, this membrane has high affinity with the components contained in the membrane-electrode junction agent of the present invention, and in particular, with the cross linkable compound (X) having the silicon-oxygen bond. Moreover, in the case where the unreacted silicon-oxygen is left in the membrane, the unreacted silicon-oxygen can be bonded to the cross linkable compound (X) in the junction agent. Accordingly, a membrane-electrode assembly that has high adhesiveness between the membrane and the electrode is obtained.

2) Second Proton Conducting Membrane (c) Acid Group-Containing Structure (B) that is Covalently Bonded to Silane Compound and has Acid Group Moreover, it is preferable that the acid group-containing structure (B) that is covalently bonded to the silane compound and has the acid group contains a structure (II) that is represented by the following structural formula, has the acid group, and can be bonded to the cross-linked structure of the membrane by the Si—O bond.

(II)

(wherein X is a —O— bond or an OH group, which is concerned with the cross-link, $R_8$ is a molecular chain group that has at least one acid group, $R_9$ is any of a methyl group, an ethyl group, a propyl group and a phenyl group, and m is any of 0, 1 and 2.)

At this time, $R_8$ has at least one acid group, and is bonded to Si by the covalent bonding. As the acid group, a variety of acids such as sulfonic acid, phosphonic acid, carboxylic acid, sulfuric acid, phosphoric acid and boric acid can be used. In particular, the sulfonic acid is preferably used, which has low pKa, is capable of sufficiently ensuring the concentration of the protons in the membrane, and is also thermally stable.

In the case where the acid group is the sulfonic acid, it is preferable that $R_8$ is a structure that is represented by the following formula (III).

(III)

(wherein n is an integer of 1 to 20.)

Here, the structure between the sulfonic acid and the cross-linked structure is not particularly limited; however, in terms of the object of the present invention, it is necessary that the structure is excellent in heat resistance, acid resistance, oxidation resistance and the like. As one of the structures which meets these requirements, there is a polymethylene chain represented by the above formula. In a structure of this formula, the polymethylene chain is not branched, and the sulfonic acid group is present on a terminal end of the polymethylene chain.

Among them, 3-trihydroxysilyl propyl sulfonic acid that is one of raw materials of a structure in which n is 3 is commercially marketed by Gelest, Inc., a synthesis method thereof using allyl bromide as the raw material is also already established, and the 3-trihydroxysilyl propyl sulfonic acid concerned is easily available. Accordingly, the 3-trihydroxysilyl propyl sulfonic acid can be especially preferably used. Moreover, a cured body is fabricated by using, as a raw material, 3-mercaptopropyl trimethoxysilane (S-810 made by Chisso Corporation), and a mercapto group of this cured body is oxidized, whereby the structure of the above formula can also be realized.

Moreover, a cured body is fabricated by using, as a raw material, an oligomer or a polymer, which has a structure of the following formula, and a mercapto group of this cured body is oxidized, whereby the structure of the above formula can also be realized.

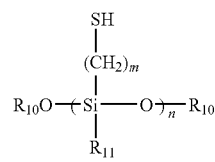
(IV)

(wherein $R_{10}$ is any of a H group, a $CH_3$ group, a $C_2H_5$ group, a $C_3H_7$ group and a $C_6H_5$ group, $R_{11}$ is any of the $CH_3$ group, the $C_2H_5$ group, the $C_3H_7$ group, the $C_6H_5$ group, an OH group, an $OCH_3$ group, an $OC_2H_5$ group, an $OC_6H_5$ group, and the O—Si bond, m is an integer of 1 to 20, and n is an integer of 3 to 500.)

Here, the one in which, in the above formula, $R_{11}$ is the $OCH_3$ group, m is 3 and n is 10 is commercially marketed by Shin-Etsu Chemical Co., Ltd (X-41-1805).

(VII) Silicon-Oxygen Bonding Structure (A)

The silicon-oxygen bonding structure (A) is the same as the above-mentioned one; however, the silicon-oxygen bonding structure (A) is used concurrently with the structure (II) represented by the above-described structural formula, and is thereby coupled to the acid group-containing structure (B) by the silicon-oxygen bond, whereby a proton conducting membrane is obtained, in which, while maintaining a high concentration of the acid group, the dissolution and the swelling, which are caused by the methanol, are less likely to occur, and the softening and the deformation, which are caused by heat, are small.

3) Third Proton Conducting Membrane (VIII) Silicon-Oxygen Bonding Structure (A)

As a silicon-oxygen bonding structure (A), the structure represented by the above-mentioned general formula (I) is preferably used, and the silicon-oxygen bonding structure (A) is substantially similar to the above-mentioned silicon-oxygen bonding structure (A).

(IX) Acid Group-Containing Structure (B) that is Covalently Bonded to Silane Compound and has Acid Group It is preferable that the third proton conducting membrane contains, as the acid group-containing structure (B), the structure in which the silane compound (α) having the polymerizable unsaturated double bond and the acid group-containing compound (β) having the acid group and the polymerizable unsaturated double bond are covalently bonded to each other.

For example, the third proton conducting membrane is composed so as to contain at least the silicon-oxygen bonding structure (A) that serves as a basic cross-linked structure (skeleton) and the acid group-containing structure (B) in which the acid group-containing compound (β) reacts with and is bonded to the silane compound (α), and so that the silicon-oxygen bonding structure (A) and the acid group-containing structure (B) can form a siloxane bond. Alternatively, the third proton conducting membrane may be such a proton conducting membrane in which, in addition to that the silane compound (α) and the acid group-containing compound (β) are bonded to each other, a plurality of silane compounds (α) and a plurality of the acid group-containing compounds (β) individually form polymers, or a cross-linking agent (C) to be described below forms a cross-linkable compound together with the silane compound (α), the acid group-containing compound (β) or another cross-linking agent (C).

In general, the silicon-oxygen cross linkable compound is rigid in terms of structure. Accordingly, when the silicon-oxygen cross linkable compound has many portions with high polarity, temperature variations sometimes cause performance deteriorations of the proton conductivity and the fuel barrier property. In the present invention, atoms groups which compose the acid in the acid group-containing compound (β) are coupled to one another while interposing the silane compounds (α) therebetween, whereby it is possible to form the cross linkable structure so that a distance between the atom groups which compose the acid and the silicon can be a fixed value or more. Accordingly, various characteristics of the membrane, such as high fuel barrier property and high strength, can be further enhanced. Moreover, many organic regions are provided in the acid group-containing structure (B), whereby the softness is imparted to the proton conducting membrane, and impact resistance of the proton conducting membrane is strengthened. Furthermore, the cross-linking agent (C) is introduced according to needs, whereby a soft and strong cross-linked structure can be obtained, and accordingly, the high impact resistance and the high polar solvent resistance are further strengthened.

Note that, in the acid group-containing structure (B), it is preferable that the atoms which compose the acid group and silicon atoms bonded to the silicon-oxygen bonding structure (A) are bonded to each other while interposing a bond of at least four continuous carbon atoms therebetween. In such a way, it becomes possible to suppress a breakage and characteristic deterioration of the membrane owing to sudden invasion of the polar solvent, which may sometimes occur in the case where the distance between the acid group and the silicon, which compose the bond, is small.

(X) Silane Compound (α)

As the silane compound (α) concerned with the structure of the acid group-containing structure (B), suitably used are the 3-(trimethoxysilyl)propyl acrylate, the 3-(methyldimethoxysilyl)propyl acrylate, the 3-(triethoxysilyl)propyl acrylate, the 3-(methyldiethoxysilyl)propyl acrylate, the trimethoxy vinyl silane, the triethoxy vinyl silane, the 3-(trimethoxysilyl)propyl methacrylate, the 3-(methyldimethoxysilyl)propyl methacrylate, the 3-(triethoxysilyl)propyl methacrylate, the 3-(methyldiethoxysilyl)propyl methacrylate, the p-styryltrimethoxysilane, the p-styryltriethoxysilane, and the like. As the compound for use in the present invention, a compound having the silicon-oxygen bond and the unsaturated double bond is particularly preferable.

(XI) Acid Group-Containing Compound (β)

As the acid group-containing compound (β) concerned with the structure of the acid group-containing structure (B), a compound having the acid group and the polymerizable unsaturated double bond is preferable, a compound that has three or more heteroatoms to which the protons are addable and has the acid group and the polymerizable unsaturated double bond is more preferable, and an acid group-containing compound (β) containing the sulfonic acid group is still more preferable.

More preferably, the acid group-containing compound (β) is acrylic ester or methacrylic ester, and a sulfur atom that composes the sulfonic acid group and an oxygen atom that composes the ester bond are bonded to each other while interposing a bond of at least two continuous carbon atoms therebetween.

Still more preferably, the acid group-containing compound (β) has an acrylamide group, and the sulfur atom that composes the sulfonic acid group and a nitrogen atom that composes the acrylamide group are bonded to each other while interposing the bond of at least two continuous carbon atoms therebetween.

As the acid group-containing compound (β) as described above, the 2-acrylamide-2-methylpropane sulfonic acid, the 2-(methacryloyloxy)ethylsulfonic acid, the 3-sulfopropyl methacrylate, p-stilsulfonic acid, the 4,4'-diaminostilbenzene-2,2'-disulfonic acid, the itaconic acid bis-(3-sulfopropyl), and the like can be preferably used.

(XII) Other Additives

In the proton conducting membrane according to the present invention, the cross-linking agent (C) may be further contained, and a compatibilizing agent (D) may be further contained.

As the cross-linking agent (C), a cross-linking agent that has, in a single molecule, two or more functional groups bondable to the silane compound (α) and the acid group-containing compound (β), which are the constituent components of the acid group-containing structure (B), is preferable. As the cross-linking agent (C), for example, hydrocarbon cross-linking agents such as the N,N'-methylene bis(acrylamide), the neopentyl glycol diacrylate, the 1,4-bis(acryloyloxy)butane, the 1,3-bis(methacryloyloxy)-2-propanol, the trimethylolpropane triacrylate, the trimethylolpropane trimethacrylate, the 1-(acryloyloxy)-3-(methacryloyloxy)-2-propanol, the divinylbenzene, the 3-(methacryloylamino) propyl trimethyl ammonium chloride and the vinyl methacrylate can be preferably used. Moreover, a fluoromonomer such as 2,2,2,-trifluoroehylacrylate and 2,2,2-trifluoroethylmethacrylate may be contained in the cross-linking agent (C). Moreover, for the purpose of enhancing the proton conductivity, the polymer material (Y) containing the above-mentioned acid group or the electrolyte material that has the proton conductivity may be added as another acid component to the cross-linking agent (C).

Note that, in order to enhance the strength of the proton conducting membrane, the membrane may be formed by immersing the above-described additive into a porous polymer material. As a raw material of the polymer material, for example, a polymer material composed of a fluorine resin, polyethylene or polyimide can be used. As the polymer material composed of the fluorine resin, the polyethylene or the polyimide, a porous material is used, in which a film thickness is 20 to 100 µm, a pore diameter is 0.05 to 10 µm, preferably 0.1 to 1.0 µm, and a porosity is 60% or more to 98% or less, preferably 90% or more to 95% or less. It is preferable that the porous material is subjected to a hydrophilic treatment. As the fluorine resin, polytetrafluoroethylene can be suitably used.

Moreover, a proton conducting membrane that concurrently uses the electrolytes composing these proton conducting membranes 1 to 3 can also be suitably used.

In the case of using the above-described membrane, the membrane has high affinity with the components contained in the membrane-electrode junction agent of the present invention, and in particular, with the cross linkable compound (X) having the silicon-oxygen bond, and moreover, the membrane can form the bond together with the cross linkable compound (X) in the junction agent in the case where the unreacted silicon-oxygen is left in the membrane. Accordingly, a membrane-electrode assembly in which the adhesiveness between the membrane and the electrode is high is obtained. Moreover, chemical structures of the electrolytes composing the membrane are relatively soft, and accordingly, the performance deterioration is small also against a humidity change and an external pressure such as sudden swelling.

<Polymer Electrolyte Fuel Cell>

Next, a polymer electrolyte fuel cell that uses the membrane-electrode assembly according to the embodiment of the present invention uses, as a unit cell, the membrane-electrode assembly shown in FIG. 1, and is composed so that a pair of separators which serve as passages of the fuel and the oxygen can be arranged on outsides of the membrane-electrode assembly. Note that the separators are not essential, and a configuration in which the separators are not arranged can also be adopted. With this configuration, it becomes possible to take out desired power. Note that, according to needs, it is also possible to construct the polymer electrolyte fuel cell in such a manner that a plurality of the above-described configurations are stacked in multi-stages, and that a plurality of the adjacent unit cells are electrically coupled to one another. Note that, in usual, current collectors which take out a current are arranged on outsides of both of the above-described separators.

<Manufacturing Method of Membrane-Electrode Assembly>

(First Manufacturing Method)

Next, a description will be made of a manufacturing method of the membrane-electrode assembly that uses the membrane-electrode junction agent according to the embodiment of the present invention. The manufacturing method of the membrane-electrode assembly according to the embodiment of the present invention includes: the step of fabricating a proton conducting membrane; the step of fabricating a membrane-electrode junction agent; the step of arranging a membrane-electrode junction agent on a surface of the proton conducting membrane or a surface of an electrode opposite to the surface of the proton conducting membrane; the step of pasting the proton conducting membrane and the electrode to each other while interposing the membrane-electrode junction agent therebetween; and the step of curing the membrane-electrode junction agent. Here, as an example, a description will be made of a fabrication method of a proton conducting membrane composed of electrolytes which compose the above-mentioned second proton conducting membrane and third proton conducting membrane.

1. Fabrication Process of Proton Conducting Membrane

For example, the proton conducting membrane suitable for the present invention can be fabricated by: a first step of preparing a mixture containing a mercapto group-containing compound (E) having a mercapto group, and has a hydrolytic silyl group covalently bonded to the mercapto group and capable of a condensation reaction, and/or a silanol group, and containing a polarity control agent (F); a second step of forming a polymerizable composition by mixing a silicon-oxygen structure (A), a silane compound (α) and an acid group-containing compound (β) into the mixture obtained in the first step; a third step of depositing the polymerizable composition obtained in the second step; a fourth step of constructing a silicon-oxygen cross-linked structure by hydrolyzing and condensing a hydrolytic silyl group and/or by condensing a silanol group; and a fifth step of converting the mercapto group in the membrane into a sulfonic acid group by oxidation, and introducing the sulfonic acid group.

—First Step—

In the first step, the mixture containing the mercapto group-containing compound (E) having the mercapto group, and has the hydrolytic silyl group covalently bonded to the mercapto group and capable of the condensation reaction, and/or the silanol group, and containing the polarity control agent (F) is prepared.

(XIII) Mercapto Group-Containing Compound (E):

The mercapto group-containing compound (E) is not particularly limited as long as it has the mercapto group, and has the hydrolytic silyl group covalently bonded to the mercapto group and capable of the condensation reaction, and/or the silanol group.

As examples of the mercapto group-containing compound (E), for example, illustrated are 3-mercaptopropyl trimethoxysilane, 3-mercaptopropyl triethoxysilane, 3-mercaptopropyl tripropoxysilane, 3-mercaptopropyl tributoxysilane, 2-mercaptoethyl trimethoxysilane, 2-mercaptoethyl triekithoxysilane, 2-mercaptoethyl tripropoxysilane, 2-mercaptoethyl tributoxysilane, mercaptomethyl trimethoxysilane, 3-mercaptopropyl methyldimethoxysilane, 3-mercaptopropyl methyldiethoxysilane, 3-mercaptopropyl methyldipropoxysilane, 3-mercaptopropyl methyldibutoxysilane, 3-mercaptopropyl ethyldimethoxysilane, 3-mercaptopropyl butyldiethoxysilane, 3-mercaptopropyl phenyldimethoxysilane, mercaptomethyl methyldiethoxysilane, and the like. However, the present invention is not limited to these.

Among them, the 3-mercaptopropyl trimethoxysilane (Sila-Ace S810 and the like, made by Chisso Corporation) is available in a large amount at a low price, and can be preferably used.

Note that, as the mercapto group-containing compound (E), a condensate of a mercapto group-containing compound, which is obtained by condensing the mercapto group-containing compound, may be used.

(XIV) Polarity Control Agent (F):

The polarity control agent (F) is a structure control agent for forming particles, and can be suitably used in the present invention. The polarity control agent (F) is an organic liquid, and desirably, is water-soluble.

As such an organic matter, mentioned are the one having a polar substituent such as the hydroxyl group, the ether group, the amide group and the ester group, the one having an acid group such as the carboxylic acid group and the sulfonic acid group or salt thereof, the one having a basic group such as amine or salt thereof, and the like.

Specifically, mentioned are: glycerin and a derivative thereof; ethylene glycol and a derivative thereof; ethylene glycol polymers (diethylene glycol, triethylene glycol, tetraethylene glycol, polyethylene glycols with a variety of molecular weights, and the like); saccharides such as glucose, fructose, mannite, sorbit and sucrose; polyvalent hydroxyl group compounds such as pentaerythritol; water-soluble resins such as polyoxyalkylene, polyvinyl alcohol, polyvinyl pyrrolidone and acrylic acid; carbonate esters such as ethylene carbonate and propylene carbonate; alkyl sulfoxides such as dimethyl sulfoxide; amides such as dimethyl formamide; polyoxyethylene alkyl ethers such as ethylene glycol monomethyl ether; and the like; however, the present invention is not limited to these.

(XV) Mixing Method:

In the case of preparing these mixtures, a solvent may be used. The solvent for use just needs to be capable of uniformly mixing the respective materials with one another, and no particular limitations are thereon. In general, water; alcohol solvents such as methanol, ethanol, 1-propanol, 2-propanol and t-butanol; ether solvents such as tetrahydrofuran, 1,4-dioxane; and the like can be suitably used.

—Second Step—

In the second step, the polymerizable composition obtained by mixing the silicon-oxygen bonding structure (A), the silane compound (α) and the acid group-containing compound (β) into the mixture obtained in the first step is prepared. The silane compound (α) and the acid group-containing compound (β) are used while being appropriately adjusted, whereby the polymerizable composition can impart the softness and the high polar solvent resistance to the proton conducting membrane in comparison with the case of fabricating the membrane by using only the mixture obtained in the first step.

As the silicon-oxygen bonding structure (A), the above-mentioned compounds can be used. Among them, the tetramethoxysilane and the tetraethoxysilane are universal articles, and are easily available in a large amount at a low price, and accordingly, can be preferably used. As the silane compound (α), the above-mentioned compounds can be used. Among them, the 3-(trimethoxysilyl)propyl methacrylate (made by Tokyo Chemical Industry Co., Ltd.) can be preferably used. As the acid group-containing compound (β), the above-mentioned compounds can be used. Among them, the 2-acrylamide-2-methylpropane sulfonic acid (made by Wako Pure Chemical Industries, Ltd.) can be preferably used.

In the second step, it is preferable to add the cross-linking agent (C). As the cross-linking agent (C), the above-mentioned compounds can be used. Among them, the trimethylolpropane triacrylate, the neopentyl glycol diacrylate and the like can be preferably used.

In this step, with regard to the silane compound (α) having the polymerizable unsaturated double bond and the acid group-containing compound (β) having the acid group and the polymerizable unsaturated double bond, types, compounding ratio and polymerization conditions thereof can be appropriately selected so that the silane compound (α) and the acid group-containing compound (β) can be copolymerized. Moreover, the types and compounding ratio of the compounds and conditions of the second, third and fourth steps can be set so that the acid group-containing structure (B) formed of the silane compound (α) and the acid group-containing compound (β) and the silicon-oxygen structure (A) can be coupled to each other by the siloxane bond.

Moreover, in the second step, an arbitrary component such as a compatibilizing agent that is sodium dodecyl sulfate and the like, a photopolymerization initiator, a thermal polymerization initiator and the like can be added within the range where the object of the present invention is not damaged.

At the time of preparing the polymerizable composition, it is preferable to design the molecular structure and reaction conditions among the cross-linked molecules and to adjust the respective components so that a reaction rate of the polymerizable unsaturated double bond in the silane compound (α) can become 30% or more, more preferably 50% or more, and that a reaction rate of the polymerizable unsaturated double bond in the acid group-containing compound (β) can become 30% or more, more preferably 50% or more.

—Third Step—

In the third step, the polymerizable composition obtained in the second step is formed (deposited) into a membrane shape. In order to form the polymerizable composition, which is obtained in the second step, into the membrane shape, publicly known methods such as casting, coating and cast molding can be used. A method of forming the polymerizable composition into the membrane shape is not particularly limited as long as a uniform membrane can be obtained. A thickness of the membrane is not particularly limited; however, the membrane can be formed so as to have an arbitrary thickness from 10 μm to 1 mm. A membrane thickness of the proton conducting membrane for the fuel cell is appropriately decided based on the proton conductivity, the fuel barrier property and the mechanical strength of the membrane, and in usual, a membrane that has a thickness ranging from 20 to 300 μm can be preferably used. Accordingly, the proton conducting membrane of the present invention is also fabricated so that the membrane thickness thereof can conform to the above-described thickness.

Moreover, in the case of performing this deposition step, a support body or a reinforcement material, which is such as fiber, a mat and a fibril, may be added, or the polymerizable composition may be impregnated into these support bodies. Such a support body or a reinforcement material can be used after being appropriately selected from a glass material, a silicon resin material, a fluorine resin material, a cyclic polyolefin material, an ultrahigh molecular weight polyolefin material and the like in consideration of the heat resistance and the acid resistance.

As an impregnation method, a publicly known method such as a dip method, a potting method, a roll press method and a vacuum press method can be used without limitations, and moreover, the polymerizable composition may be heated, pressurized, and so on.

—Fourth Step—

In the fourth step, the hydrolytic silyl group contained in the membrane-like matter deposited in the third step is hydrolyzed and condensed, and/or the silanol group contained therein is condensed, whereby a membrane that contains, as a constituent element, the continuum of the particles, which is composed of the silicon-oxygen cross-linked structure, is formed.

The proton conducting membrane in the present invention is characterized in forming the cross-linked structure by the hydrolysis and condensation of an alkoxy silyl group and the like, stably exerting the proton conductivity even at a high temperature, and also hardly causing a shape change and the like. Such creation of the Si—O—Si bond by the hydrolysis and condensation of the alkoxy silyl group and the like is well known as a sol-gel reaction.

In the sol-gel reaction, it is common to use a catalyst in order to accelerate and control the reaction. In usual, acid or a base is used as the catalyst.

(XVI) Catalyst (G):

The catalyst (G) for use in the manufacturing method of the proton conducting membrane of the present invention may be either the acid or the base. In the case of using the acid catalyst, Bronsted acid such as hydrochloric acid, sulfuric acid, phosphoric acid and acetic acid is used. A type, a concentration and the like of the acid are not particularly limited, and the acid just needs to be an available one.

As the base catalyst, sodium hydroxide, potassium hydroxide, ammonia and organic amines can be preferably used. Moreover, as a condensation catalyst, fluoride such as potassium fluoride, ammonium fluoride, tetramethylammonium fluoride and tetraethylammonium fluoride may be used.

The step of introducing the catalyst may be performed at any timing from the first step to the fourth step. The simplest method is a method of introducing the catalyst at the time of preparing the mixture in the first step; however, in this case, it is necessary to consider the pot life and the setting time in the deposition as the third step.

(XVII) Condensation Reaction:

It is possible to perform the condensation reaction for the alkoxy silyl group and the like even at room temperature; however, heating should be performed in order to shorten a reaction time and to perform more efficient curing. A publicly known method just needs to be used for the heating, and heating by an oven, pressurization/heating by an autoclave, far infrared ray heating, electromagnetic induction heating, microwave heating and the like can be used. The heating can be performed at an arbitrary temperature from the room temperature to 300° C., and preferably, is performed at 100 to 250° C. At this time, the heating may be performed under reduced pressure or under inert gas such as nitrogen and argon.

Moreover, for the heating, a method of avoiding a sudden environment change may be adopted. For example, in the method, the temperature is gradually raised to a high temperature after curing the above-described subjects (membrane) at the room temperature for a certain time.

Moreover, the heating may be performed under vapor in order to supply water required for the hydrolysis, or may be performed under solvent vapor in order to prevent sudden drying of the membrane.

According to needs, an unreacted matter and a cured catalyst may be removed by water rinsing from the membrane already subjected to the fourth step, and the membrane may be further subjected to ion exchange by the sulfuric acid and the like.

—Fifth Step—

In the manufacturing method of the proton conducting membrane of the present invention, the fifth step is a step of oxidizing the mercapto group in the membrane into the sulfonic acid group, and introducing the sulfonic acid group into the surfaces of the particles.

As water for use in washing, water that does not contain metal ions, such as distilled water and ion-exchanged water, is preferable. In the water rinsing, heating may be performed, or the water rinsing may be made more efficient by applying a pressure and giving vibrations. Moreover, in order to promote penetration of the sulfonic acid group into the membrane, a mixed solvent obtained by adding methanol, ethanol, n-propanol, i-propanol, acetone, tetrahydrofuran or the like to water may be used.

The mercapto group oxidation method for use in the present invention is not particularly limited, and a general oxidizer can be used. Specifically, for example, as mentioned in Shin Jikken Kagaku Koza (issued by Maruzen, 3rd edition, Volume 15, 1976), oxidizers such as nitric acid, hydrogen peroxide, oxygen, organic peroxide (percarboxylic acid), bromine water, hypochlorite, hypobromite, potassium permanganate and chromic acid can be used.

The membrane fabrication method described above is a preferable example, and the present invention is not limited to this method. For example, if the mixture obtained in the first step is used as a main component, and the membrane is fabricated by subjecting the mixture to the third step, the fourth step and the fifth step, then a membrane in which the heat resistance and the fuel barrier property are higher is obtained. Moreover, in another example, if the membrane is fabricated by subjecting the composition, which is obtained in the second step, to the third step and the fourth step, then a membrane in which the softness and such membrane-electrode adhesiveness are higher is obtained.

In the case of using this membrane, the affinity thereof with the component contained in the membrane-electrode junction agent of the present invention, and in particular, with the cross linkable compound (X) having the silicon-oxygen bond is high. Moreover, in such a case where the unreacted silicon-oxygen is left in the membrane, the membrane can form the bond together with the cross linkable compound (X) in the junction agent. Accordingly, the membrane-electrode assembly in which the adhesiveness between the membrane and the electrode is high is obtained.

2. Process of Producing Membrane-Electrode Junction Agent

Next, the membrane-electrode junction agent arranged on both surfaces of the proton conducting membrane obtained in the fabrication process of the proton conducting membrane is produced. Here, the cross linkable compound (X), the polymer material (Y) and the hydrophilic resin (Z), which are already described, are prepared, and are mixed together while being diluted by water, and so on, whereby the membrane-electrode junction agent is produced.

3. Process of Arranging Membrane-Electrode Junction Agent

Next, the membrane-electrode junction agent is coated on the surface of the proton conducting membrane or on the surface of the electrode, which is to be pasted onto the surface of the proton conducting membrane. As a coating method, for example, there can be used a roll coating method, a spray coating method, a doctor blade method, a dip coating method, a transfer method, an electrodeposition coating method, and the like.

4. Pasting Process

Next, the proton conducting membrane and the electrode are pasted to each other while interposing the membrane-electrode junction agent therebetween. At the time of this pasting, a pressure may be applied or heating given to subjects concerned. A preferable lower limit of a temperature at the pasting time is 20° C., and an upper limit thereof is not particularly limited; however, the upper limit should be appropriately set to an extent where the physical properties of the membrane are not damaged, and in usual, it is preferable to perform the heating at a temperature of 300° C. or less. Moreover, the proton conducting membrane and the electrode are pasted to each other while applying the pressure thereto, whereby intimate adhesiveness between the proton conducting membrane and the electrode is enhanced, and accordingly, a junction layer in which proton conduction efficiency is high can be formed. The pressure is not particularly limited, and an optimum value thereof depends on a pressure application method and the electrode for use; however, it is preferable to set the pressure at 0.16 kN/cm$^2$ or more and a pressure at which the electrode and the membrane are not broken or less.

5. Curing Process

Next, the membrane-electrode assembly obtained by pasting the electrode is cured. At this time, it is preferable to heat the membrane-electrode assembly. A heating method is not particularly limited, and arbitrary heating methods such as heating by a heat source such as the oven, the far infrared heating and induction heating can be used. Note that "4. Pasting process" and "5. Curing process" may be performed independently of each other, or may be performed simultaneously as one process.

(Second Manufacturing Method)

In a second manufacturing method of the membrane-electrode assembly, the membrane-electrode assembly may be subjected to the following processes shown by 3A to 5A after being subjected to "1. Fabrication process of proton conducting membrane" and "2. Process of producing membrane-electrode junction agent" in the first manufacturing method.

3A. Process of Arranging Membrane-Electrode Junction Agent

The membrane-electrode junction agent is coated on the surface of the proton conducting membrane by a substantially similar method to that of "3. process of arranging membrane-electrode junction agent" described in the first manufacturing method. Thereafter, the membrane is dried, and a membrane having a junction layer is obtained. At the drying time, methods such as vacuum drying, heat drying and heat pressing can be used.

4A. Pasting Process

The polar solvent such as water and methanol is impregnated into the obtained membrane having the junction layer, and the membrane having the junction layer is softened and/or swelled. Then, each of the electrodes (fuel electrode and air electrode) is pasted to the softened and/or swelled membrane having the junction layer. Thereafter, the obtained subject is heat-pressed by a substantially similar method to that in "4. Pasting process" described in the first manufacturing method.

5A. Curing Process

The membrane-electrode assembly obtained in the pasting process 4A is cured. At this time, it is preferable to heat the membrane-electrode assembly. A heating method is not particularly limited, and arbitrary heating methods such as the heating by the heat source such as the oven, the far infrared heating and the induction heating can be used. Note that "4A. Pasting process" and "5A. Curing process" may be performed independently of each other, or may be performed simultaneously as one process.

In the case of using the second manufacturing method of the membrane-electrode assembly according to the embodiment, it is particularly preferable that the junction agent have a different composition from that of the electrolyte that composes the membrane, and that a swelling rate of a dried film of the junction agent and/or of the junction layer be larger than a swelling rate of the electrolyte material of the membrane. More preferably, a linear swelling rate of the dried film and/or the junction layer is twice or more a linear swelling rate of the membrane in a thickness direction. If the swelling rate of the junction layer is higher than the swelling rate of the electrolyte material of the membrane, then sufficient adhesion force between the membrane and the electrode is obtained.

Moreover, by using the second manufacturing method, a time from "3A. Process of arranging membrane-electrode junction agent" to "4A. Pasting process" can be ensured to be long in a weekly or monthly order.

Furthermore, in accordance with the second manufacturing method, such a malfunction that a power generation output is lowered by the fact that the impregnation of the junction agent into the electrode is too much is less likely to occur, and it becomes easy to set process conditions.

Note that, in the case where the cross linkable compound (X) having the silicon-oxygen bond contains the liquid alkoxysilane and the aqueous solution of the silica and/or the silicate, it is particularly preferable to fabricate the membrane-electrode assembly by using the second manufacturing method. This is because, in the case where the cross linkable compound (X) contains the aqueous solution of the silica and/or the silicate, it is easy to form the gelated film in "3A. Process of arranging membrane-electrode junction agent". It is not necessary that the polar solvent be completely evaporated from the film, and it is not necessary that the cross linkable compound having the silicon-oxygen bond cause the perfect reaction. A degree of the softening and/or the swelling in "4A. Pasting step" can be adjusted by a content of the silica and/or the silicate, and accordingly, the high adhesiveness between the membrane and the electrode and the high output at the time of the power generation can be made compatible with each other.

Moreover, when the membrane-electrode assembly is heated and cured in "4A. Pasting step" and/or "5A. Curing step", the alkoxysilane is hydrolyzed and polycondensed, whereby a strong three-dimensional cross-linked structure is formed, and accordingly, the heat resistance, the swelling resistance, the water resistance and the like are enhanced. In this case, it is preferable that the alkoxysilane cause the perfect reaction. Note that a reaction rate of the alkoxysilane can be estimated by a condensation degree measured by the 29Si—NMR analysis method or the like.

<Manufacturing Method of Polymer Electrolyte Fuel Cell>

A manufacturing method of the polymer electrolyte fuel cell that uses the membrane-electrode assembly obtained by the above-mentioned method is not particularly limited. However, as an example, the form is mentioned, in which the pair of separators which serve as the passages of the fuel and the air (oxygen) are arranged on the outsides of the membrane-electrode assembly, and the current collectors which take out the current are arranged on the outsides of both of the separators.

Moreover, the membrane-electrode assembly concerned is taken as the unit cell, the pair of separators which serve as the passages of the fuel and the air (oxygen) are arranged on outsides of the unit cell, and a plurality of the unit cells adjacent to one another are coupled to one another, whereby a polymer electrolyte fuel cell can also be obtained.

EXAMPLES

Next, a description will be made below of examples in order to describe the present invention more in detail; however, the present invention is not limited only to these examples.

Example 1

1. Fabrication of Proton Conducting Membrane 21.2 g of the 3-mercaptopropyl trimethoxysilane (Sila-Ace S-810, made by Chisso Corporation), 52.5 g of tetraethoxysilane (KBE-04, made by Shin-Etsu Chemical Co., Ltd.) and 10.7 g of the methanol were measured in a flask, and were stirred for five minutes at normal temperature. To a mixture thus obtained, a solution obtained by mixing 6.2 g of 0.1N hydrochloric acid and 8.2 g of the methanol with each other was added, followed by further stirring for three hours at the normal temperature. Subsequently, a solution obtained by mixing 0.057 g of the potassium fluoride and 9.7 g of the methanol with each other was added to a resultant, and a mixed solution thus obtained was stirred for three hours while being heated to 80° C. in an oil bath. The mixed solution was cooled down to 5° C., and thereafter, the methanol was removed therefrom by fractional distillation in vacuum at 35° C. 120 mL of diethyl ether was added to an obtained solution, followed by stirring for 10 minutes at the normal temperature, and thereafter, a resultant solution was cooled down to 5° C., and was filtered by using filter paper (quantitative filter paper No. 5C, made by ADVANTEC Mfs, Inc.). The diethyl ether was removed from obtained filtrate by the fractional distillation in vacuum at 35° C., and a mercapto group-containing silane oligomer was obtained.

Under an ice-cold condition, 1.2 g of triethylamine was dropped into a solution obtained by mixing 2.0 g of the obtained mercapto group-containing silane oligomer, 0.22 g of a silicon oligomer KR-500 (KR-500, made by Shin-Etsu Chemical Co., Ltd.) and 0.40 g of the polyethylene glycol 200 (made by Wako Pure Chemical Industries, Ltd.) with one another, and then 0.50 g of water was dropped thereinto. After stirring for 10 minutes, a half amount of a solution obtained as above was poured into a Petri dish made of Teflon® with an inner diameter of 15 cm, and the Petri dish was covered with a glass plate.

A membrane-like matter thus fabricated was left standing still as it was for three days at the room temperature, and was gelated. The membrane thus gelated was heated at 80° C. in an oven, left in a desiccator filled with water for 12 hours, and was further heated at 120° C. in the oven for 24 hours. The obtained membrane-like matter was taken out of the oven, and was immersed in water, 1N sulfuric acid and water individually for one hour, whereby the unreacted matter, the catalyst and the polarity control agent were extracted from the membrane.

The obtained membrane was immersed into peracetic acid prepared by mixing 125 mL of the acetic acid and 100 mL of 30% hydrogen peroxide water with each other, followed by heating at 80° C. for one hour. A membrane thus obtained was taken out of the peracetic acid solution, and was immersed into water at 80° C. three times individually for one hour, whereby the peracetic acid solution was sufficiently extracted. As a result, a somewhat whitish membrane was obtained. This membrane had a circular shape with a diameter of approximately 4 cm, in which a thickness was 75 µm.

2. Production of Membrane-Electrode Junction Agent

Mixed were: 0.20 g of tetramethoxysilane (KBM-04, made by Shin-Etsu Chemical Co., Ltd.); 0.40 g of a 10% aqueous solution of polyvinyl alcohol (made by Japan Vam & Poval Co., Ltd.; average degree of polymerization: 3300; degree of saponification: 99% or more); 2.0 g of a 2.5% aqueous solution of poly(2-acrylamide-2-methylpropane sulfonic acid) (in which a 15% aqueous solution made by Sigma-Aldrich Corporation was diluted by water); and 0.20 g of a PTFE dispersion (double dilution with water of PTFE 30J, made by Du Pont-Mitsui Fluorochemicals Company, Ltd.; PTFE content: 55 to 60%; poly(oxyethylene)octylphenyl ether: 3.6%; water: 35 to 45%; average particle diameter of fluorine resin: 0.22 micron). In such a way, a membrane-electrode junction agent was produced.

3. Fabrication of Membrane-Electrode Assembly

The membrane-electrode junction agent obtained in the above-described process was sufficiently impregnated into both surfaces of the proton conducting membrane according to the present invention. Then, a gas diffusion electrode (made by E-TEK Inc. in the U.S.A.; area: 2.5×2.5 cm; platinum-supported amount: 0.5 mg/cm$^2$) was pasted to a cathode side of the proton conducting membrane, and a gas diffusion electrode (made by E-TEK Inc. in the U.S.A.; area: 2.5×2.5 cm; platinum supported amount: 0.5 mg/cm$^2$; ruthenium supported amount: 0.3 mg/cm$^2$) was pasted to an anode side of the proton conducting membrane.

An assembly thus obtained was heated at 80° C. for one hour in the oven, and was thereafter pressed at 120° C.-1 kN for three minutes by a press machine (made by Sintokogio, Ltd.), whereby a membrane-electrode assembly was obtained.

Example 2

1. Fabrication of Proton Conducting Membrane 0.16 g of water and 0.060 g of triethylamine were dropped into a liquid obtained by mixing 4.37 g of the mercapto group-containing silane oligomer obtained in Example 1 and 0.51 g of the silicon oligomer KR-500 (KR-500, made by Shin-Etsu Chemical Co., Ltd.) with each other. A resultant solution was stirred for 20 minutes under the ice-cold condition, and was thereafter impregnated into a polyethylene-made porous material (membrane thickness: approximately 40 µm; average pore diameter: 0.7 µm; cut into a square with a side of 15 cm) on a fluorine resin film. Such a membrane obtained after the impregnation was covered with a fluorine resin film, and an applicator was allowed to level this resultant from the above so that a membrane thickness of the impregnated porous material (membrane) could be 45 µm. The impregnated porous material was aged at the room temperature for 16 hours while being left covered with the fluorine resin film, and thereafter, the film was peeled off therefrom, and the porous material was further aged at the room temperature for eight hours. The aged membrane was sandwiched between two glass plates while interposing fluorine resin films therebetween, and in this state, was put into a glass-made container together with 500 mL of water, and was heated and cured at 80° C. for 24 hours by using a gear oven. Thereafter, the membrane was heated from 100° C. to 200° C. at a rate of 20° C. per hour, and was further fired at 200° C. for three hours. The obtained membrane was moved to a glass Petri dish, and was immersed into a 1N hydrochloric acid solution and water, whereby the unreacted matter and the catalyst were extracted from the membrane. After an extract was removed, the membrane was immersed into peracetic acid prepared by mixing 125 mL of acetic acid and 100 mL of 30% hydrogen peroxide water with each other, and was heated at 60° C. for one hour by a hot plate. The obtained membrane was taken out of the peracetic acid solution, and was immersed into water of 80° C. twice individually for one hour, whereby the peracetic acid solution was sufficiently removed therefrom. In such a way, a translucent membrane was obtained. This was defined as a proton conducting membrane.

2. Production of Membrane-Electrode Junction Agent

Under the ice-cold condition, mixed by an ultrasonic homogenizer were: 0.50 g of a 15% aqueous solution of polystyrene sulfonic acid (made by Sigma-Aldrich Corporation); 2.0 g of a 15% aqueous solution of poly(2-acrylamide-2-methylpropane sulfonic acid) (made by Sigma-Aldrich Corporation; average molecular weight: approximately two millions); 5.0 g of a 10% aqueous solution of the polyvinyl alcohol (made by Japan Vam & Poval Co., Ltd.; average degree of polymerization: approximately 3300; degree of saponification: 99% or more); 0.50 g of a 10% aqueous solution of sodium silicate (made by Wako Pure Chemical Industries, Ltd., 55% aqueous solution); and 0.34 g of 10% sulfuric acid. In such a way, a membrane-electrode junction agent was produced.

3. Fabrication of Membrane-Electrode Assembly

The membrane-electrode junction agent obtained in the above-described process was coated on both surfaces of the proton conducting membrane, and was sandwiched between fluorine resin films, and a resultant thus obtained was leveled so that a thickness of the junction layer on each side could become 20 microns, and was dried and cured in the oven at 80° C. for one hour, whereby a membrane (membrane having junction layers) on surfaces of which junction layers were formed was obtained.

After the membrane having the junction layers was immersed in 5% sulfuric acid for one minute, the membrane was washed by pure water several times, whereby the junction layers were softened and swelled by water. The gas diffusion electrode (made by E-TEK Inc. in the U.S.A.; area: 2.5×2.5 cm; platinum-supported amount: 0.5 mg/cm$^2$) was pasted to a cathode side of the membrane having the junction layers softened and swelled by water, and the gas diffusion electrode (made by E-TEK Inc. in the U.S.A.; area: 2.5×2.5 cm; platinum supported amount: 0.5 mg/cm$^2$; ruthenium supported amount: 0.3 mg/cm$^2$) was pasted to an anode side of the membrane concerned, whereby a membrane-electrode assembly was fabricated. The obtained membrane-electrode assembly was pressed at 120° C.-1 kN for 10 minutes by the press machine (made by Sintokogio, Ltd.), whereby a membrane-electrode assembly was obtained.

Example 3

1. Fabrication of Proton Conducting Membrane 0.12 g of water and 0.060 g of triethylamine were dropped into a liquid obtained by mixing 4.07 g of a copolymer (X-41-1805, made by Shin-Etsu Chemical Co., Ltd.) of 3-mercaptopropyl trimethoxysilane and tetraethoxysilane and 1.0 g of 1,8-bis(triethoxysilyl)octane (made by Gelest, Inc.) with each other. A resultant solution was stirred at the room temperature for 20 minutes until becoming transparent, and was thereafter developed on a fluorine film. On this solution, a polyethylene-made porous material (average pore diameter: 0.5 µm; membrane thickness: 50 µm; cut into a square with a side of 10 cm) was covered, and the porous material was impregnated with this liquid. The liquid was impregnated into the porous material by using a polyethylene-made pallet so as not to cause unevenness. Thereafter, such a membrane obtained after the impregnation was covered with a fluorine resin film, and the applicator was allowed to level this resultant from the above so that a membrane thickness of the impregnated porous material (membrane) could be 50 µm.

The impregnated porous material was aged at the room temperature for eight hours while being left covered with the fluorine resin film, and thereafter, the fluorine resin film was peeled off therefrom, and the porous material was further aged for 16 hours. The aged membrane was sandwiched between fluorine resin films, these were further sandwiched between two glass plates, and in this state, these were put into the glass-made container together with 500 mL of water, and was heated and cured at 80° C. for 24 hours by using the gear oven. Thereafter, these were fired at 120° C. for eight hours. The fired membrane was moved to another glass-made container, and was immersed into a 1N hydrochloric acid solution and water individually for one hour under a condition of 80° C., whereby the unreacted matter and the catalyst were extracted from the membrane. After an extract was removed, the membrane was immersed into peracetic acid prepared by mixing 125 mL of acetic acid and 100 mL of 30% hydrogen peroxide water with each other, and was heated at 60° C. for one hour by the hot plate. The obtained membrane was taken out of the peracetic acid solution, and was immersed into water of 80° C. three times individually for one hour, whereby the peracetic acid solution was sufficiently removed therefrom. In such a way, a translucent membrane was obtained. This was defined as a proton conducting membrane.

2. Production of Membrane-Electrode Junction Agent

While being stirred under the ice-cold condition, 0.15 g of 10% sulfuric acid was dropped into a liquid obtained by mixing 1.24 g of 3-trimethoxysilyl propyl acrylate (made by Tokyo Chemical Industry Co., Ltd.), 3.51 g of tetraethoxysilane (KBE-04, made by Shin-Etsu Chemical Co., Ltd.) and 3 g of methanol with one another. A resultant solution was further stirred for 30 minutes.

Under the ice-cold condition, stirred/mixed by the ultrasonic homogenizer were: 10 g of a 40% aqueous solution of 2-acrylamide-2-methylpropane sulfonic acid (made by Wako Pure Chemical Industries, Ltd.), 2.0 g a 5% aqueous solution of N,N'-methylene-bis-acrylamide (made by Wako Pure Chemical Industries, Ltd.), and 1.0 g of a 10% aqueous solution of a polymerization initiator V-50 (made by Wako Pure Chemical Industries, Ltd., 2,2'-azobis(2-methylpropionamizine)dihydrochloride). A solution thus stirred/mixed was dropped into the above-described silane compound solution.

3.0 g of a polymerizable composition solution thus obtained was mixed with 5.0 g of a 10% aqueous solution of the polyvinyl alcohol (made by Japan Vam & Poval Co., Ltd.; average degree of polymerization: 3300; degree of saponification: 99% or more), followed by stirring, whereby a membrane-electrode junction agent was obtained.

3. Fabrication of Membrane-Electrode Assembly

The membrane-electrode junction agent obtained in the above-described process was coated on both surfaces of the proton conducting membrane, and was sandwiched between fluorine resin films, and a resultant thus obtained was leveled so that a thickness of the junction layer on each side could become 30 microns, and was dried and cured in the oven at 80° C. for one hour, whereby a membrane (membrane having junction layers) on surfaces of which junction layers were formed was obtained.

After the above-described membrane having the junction layers was immersed in 5% sulfuric acid for one minute, the membrane was washed by pure water several times, whereby the membrane having the junction layers was softened and/or swelled by water. The gas diffusion electrode (made by E-TEK Inc. in the U.S.A.; area: 2.5×2.5 cm; platinum-supported amount: 0.5 mg/cm$^2$) was pasted to a cathode side of the membrane having the junction layers, which was softened and/or swelled by water, and the gas diffusion electrode (made by E-TEK Inc. in the U.S.A.; area: 2.5×2.5 cm; platinum supported amount: 0.5 mg/cm$^2$; ruthenium supported amount: 0.3 mg/cm$^2$) was pasted to an anode side of the membrane concerned, whereby a membrane-electrode assembly was fabricated. The obtained membrane-electrode assembly was pressed at 120° C.-1 kN for 10 minutes by the press machine (made by Sintokogio, Ltd.), and was subsequently heated in the oven at 80° C. for one hour, whereby a membrane-electrode assembly was obtained.

Moreover, when a fracture surface of the above-described membrane having the junction layers was observed by means of a field-emission microscope, it was confirmed that the membrane took a structure of indeterminate particles with a diameter of approximately from 50 nm to 80 nm in insides of the junction layers.

Example 4

1. Fabrication of Proton Conducting Membrane 0.50 g of the 1,8-bis(triethoxysilyl)octane (made by Gelest, Inc.) and 0.50 g of the tetraethoxysilane (KBE-04, made by Shin-Etsu Chemical Co., Ltd.) were dissolved into 0.75 g of isopropanol. 0.75 g of isopropanol was added to 1.8 g of a 33% aqueous solution of 3-(trihydroxysilyl)propane sulfonic acid (made by Gelest, Inc.). Both of the above were mixed with each other after being cooled down to approximately 0° C., followed by stirring for several minutes. As a result, a mixed solution that was transparent and a little viscous was obtained.

1.24 g of the mixed solution thus obtained, 0.11 g of acrylic acid 3-(trimethoxysilyl)propyl (made by Tokyo Chemical Industry Co., Ltd.), 0.10 g of vinyl trimethoxysilane (KBM-1003, made by Shin-Etsu Chemical Co., Ltd.) and 1.16 g of the tetraethoxysilane (KBE-04, made by Shin-Etsu Chemical Co., Ltd.) were mixed together. A mixed liquid thus obtained was stirred at approximately 0° C. for 10 minutes. Thereafter, under the ice-cold condition, a liquid obtained by dissolving 6.25 g of the 2-acrylamide-2-methylpropane sulfonic acid (made by Wako Pure Chemical Industries, Ltd.) into 6.25 g of water, 1.0 g of a 10% aqueous solution of the N,N'-methylene-bis-acrylamide (made by Wako Pure Chemical Industries, Ltd.), and 0.45 g of 1,4-divinylbenzene (made by Wako Pure Chemical Industries, Ltd.) were dropped into the obtained liquid. Moreover, a mixed solution thus obtained was stirred for 30 minutes while being subjected to nitrogen bubbling. To the mixed solution, added were 0.20 g of the polymerization initiator V-50 (made by Wako Pure Chemical Industries, Ltd., 2,2'-azobis(2-methylpropionamizine)dihydrochloride), and 0.10 g of 2,2'-azobis(isobutyronitrile) (made by Wako Pure Chemical Industries, Ltd.). In such a way, a polymerizable composition was obtained.

On a fluorine resin film, 3.0 g of the obtained polymerizable composition was impregnated into the polyethylene-made porous material (average pore diameter: 0.7 μm; thickness: 40 μm; cut into a square with a side of 15 cm). The impregnated membrane was coated with a fluorine resin film, and the applicator was allowed to level this resultant from the above so that a membrane thickness of the impregnated porous material (membrane) could be 45 μm. This resultant was sandwiched between two glass plates while interposing the fluorine resin films therebetween, and was heated and cured at 80° C. for 24 hours by using the gear oven, followed by firing at 100° C. for three hours, and further at 120° C. for three hours. In such a way, a membrane was obtained. The obtained membrane was washed by being immersed into water of 80° C. twice individually for one hour, and a translucent proton conducting membrane was obtained.

2. Production of Membrane-Electrode Junction Agent

While being stirred under the ice-cold condition, 0.15 g of 10% sulfuric acid was dropped into a liquid obtained by mixing 1.24 g of the 3-trimethoxysilyl propyl acrylate (made by Tokyo Chemical Industry Co., Ltd.), 3.51 g of the tetraethoxysilane (KBE-04, made by Shin-Etsu Chemical Co., Ltd.) and 3 g of methanol with one another. A resultant solution was further stirred for 30 minutes.

Stirred/mixed by the ultrasonic homogenizer were: 10 g of a 40% aqueous solution of the 2-acrylamide-2-methylpropane sulfonic acid (made by Wako Pure Chemical Industries, Ltd.); 2.0 g a 5% aqueous solution of the N,N'-methylene-bis-acrylamide (made by Wako Pure Chemical Industries, Ltd.); and 1.0 g of a 10% aqueous solution of the polymerization initiator V-50 (made by Wako Pure Chemical Industries, Ltd.). A solution thus stirred/mixed was dropped into the above-described silane compound solution.

3.0 g of a polymerizable composition solution thus obtained was mixed with 4.0 g of a 10% aqueous solution of the polyvinyl alcohol (made by Japan Vam & Poval Co., Ltd.; average degree of polymerization: 3300; degree of saponification: 99% or more), 0.40 g of a 10% aqueous solution of the sodium silicate (made by Wako Pure Chemical Industries, Ltd., 55% aqueous solution); and 0.50 g of 10% sulfuric acid, followed by stirring, whereby a membrane-electrode junction agent was obtained.

3. Fabrication of Membrane-Electrode Assembly

The membrane-electrode junction agent obtained in the above-described process was coated on both surfaces of the proton conducting membrane, and was sandwiched between fluorine resin films, and a resultant thus obtained was leveled so that a thickness of the junction layer on each side could become 20 microns, and was dried and cured in the oven at 80° C. for one hour, whereby a membrane (membrane having junction layers) on surfaces of which junction layers were formed was obtained.

After the above-described membrane having the junction layers was immersed in 5% sulfuric acid for one minute, the membrane was washed by pure water several times, whereby the junction layers were softened and swelled by water. The gas diffusion electrode (made by E-TEK Inc. in the U.S.A.; area: 2.5×2.5 cm; platinum-supported amount: 0.5 mg/cm$^2$) was pasted to a cathode side of the membrane having the junction layers softened and swelled by water, and the gas diffusion electrode (made by E-TEK Inc. in the U.S.A.; area: 2.5×2.5 cm; platinum supported amount: 0.5 mg/cm$^2$; ruthenium supported amount: 0.3 mg/cm$^2$) was pasted to an anode side of the membrane concerned, whereby a membrane-electrode assembly was fabricated. The obtained membrane-electrode assembly was pressed at 120° C.-1 kN for 10 minutes by the press machine (made by Sintokogio, Ltd.), and was subsequently heated in the oven at 80° C. for one hour, whereby a membrane-electrode assembly was obtained.

Moreover, when a fracture surface of the above-described membrane having the junction layers was observed by means of the field-emission microscope, it was confirmed that the membrane took a structure of indeterminate particles with a diameter of approximately from 40 nm to 60 nm in insides of the junction layers.

Example 5

1. Fabrication of Proton Conducting Membrane

A liquid was obtained by mixing 0.22 g of the acrylic acid 3-(trimethoxysilyl)propyl (made by Tokyo Chemical Industry Co., Ltd.), 0.20 g of the vinyl trimethoxysilane (KBM-1003, made by Shin-Etsu Chemical Co., Ltd.), 1.16 g of the tetraethoxysilane (KBE-04, made by Shin-Etsu Chemical Co., Ltd.) and 1.0 g of methanol together. The liquid was stirred at approximately 0° C. for 10 minutes. Thereafter, under the ice-cold condition, a liquid obtained by dissolving 6.25 g of the 2-acrylamide-2-methylpropane sulfonic acid (made by Wako Pure Chemical Industries, Ltd.) into 6.25 g of water, 1.0 g of a 10% aqueous solution of the N,N'-methylene-bis-acrylamide (made by Wako Pure Chemical Industries, Ltd.), and 0.45 g of the 1,4-divinylbenzene (made by Wako Pure Chemical Industries, Ltd.) were dropped into the obtained liquid. Moreover, a mixed solution thus obtained was stirred for 30 minutes while being subjected to nitrogen bubbling. To the mixed solution, added were 0.20 g of the polymerization initiator V-50 (made by Wako Pure Chemical Industries, Ltd., 2,2'-azobis(2-methylpropionamizine) dihydrochloride), and 0.10 g of the 2,2'-azobis(isobutyronitrile)

(made by Wako Pure Chemical Industries, Ltd.), followed by sufficient stirring. Thereafter, a polymerizable composition was obtained.

On a fluorine resin film, 3.0 g of the obtained polymerizable composition was impregnated into the polyethylene-made porous material (average pore diameter: 0.7 μm; thickness: 40 μm; cut into a square with a side of 15 cm). The impregnated membrane was coated with a fluorine resin film, and the applicator was allowed to level this resultant from the above so that a membrane thickness of the impregnated porous material (membrane) could be 45 μm. This resultant was sandwiched between two glass plates while interposing the fluorine resin films therebetween, and was heated and cured at 80° C. for 24 hours by using the gear oven, followed by firing at 100° C. for three hours, and further at 120° C. for three hours. In such a way, a membrane was obtained. The obtained membrane was washed by being immersed into water of 80° C. twice individually for one hour, and a translucent proton conducting membrane was obtained.

2. Production of Membrane-Electrode Junction Agent

Under the ice-cold condition, mixed by the ultrasonic homogenizer were: 0.50 g of a 15% aqueous solution of the polystyrene sulfonic acid (made by Sigma-Aldrich Corporation); 2.0 g of a 15% aqueous solution of the poly(2-acrylamide-2-methylpropane sulfonic acid) (made by Sigma-Aldrich Corporation; average molecular weight: approximately two millions); 5.0 g of a 10% aqueous solution of the polyvinyl alcohol (made by Japan Vam & Poval Co., Ltd.; average degree of polymerization: approximately 3300; degree of saponification: 99% or more); 0.50 g of a 10% aqueous solution of the sodium silicate (made by Wako Pure Chemical Industries, Ltd., 55% aqueous solution); and 0.34 g of 10% sulfuric acid. Moreover, 0.10 g of triglycerol (made by Fluka Chemie AG, 1,3-bis(2,3-dihydroxypropyl)-2-propanol) was mixed with a resultant mixture, followed by stirring, and furthermore, 0.30 g of the tetraethoxysilane (KBE-04, made by Shin-Etsu Chemical Co., Ltd.) was mixed therewith, followed by stirring. In such a way, a membrane-electrode junction agent was produced.

3. Fabrication of Membrane-Electrode Assembly

A membrane-electrode assembly was fabricated by the same method as that in Example 4.

Example 6

1. Fabrication of Proton Conducting Membrane

The same membrane as that in Example 5 was used.

2. Production Process of Membrane-Electrode Junction Agent

A liquid was obtained by mixing 0.51 g of vinyl trimethoxysilane (made by Tokyo Chemical Industry Co., Ltd.), 0.64 g of the 3-trimethoxysilyl propyl acrylate (made by Tokyo Chemical Industry Co., Ltd.), 3.51 g of the tetraethoxysilane (KBE-04, made by Shin-Etsu Chemical Co., Ltd.) and 3 g of methanol together. 0.18 g of 10% sulfuric acid was dropped into the obtained liquid while being stirred under the ice-cold condition, followed by further stirring for 30 minutes.

A liquid was obtained by stirring/mixing, by means of the ultrasonic homogenizer, 4.4 g of a 25% aqueous solution of vinyl sulfonic acid (made by Tokyo Chemical Industry Co., Ltd.), 6.5 g of a 40% aqueous solution of the 2-acrylamide-2-methylpropane sulfonic acid (made by Wako Pure Chemical Industries, Ltd.), 2.0 g of a 5% aqueous solution of the N,N'-methylene-bis-acrylamide (made by Wako Pure Chemical Industries, Ltd.), and 1.0 g of a 10% aqueous solution of the polymerization initiator V-50 (made by Wako Pure Chemical Industries, Ltd., 2,2'-azobis(2-methylpropionamizine)dihydrochloride) together. Then, the obtained liquid was dropped into the above-described silane compound solution.

3.5 g of a polymerizable composition solution thus obtained was mixed with 3.0 g of a 10% aqueous solution of the polyvinyl alcohol (made by Japan Vam & Poval Co., Ltd.; average degree of polymerization: 3300; degree of saponification: 99% or more), 0.40 g of a 10% aqueous solution of the sodium silicate (made by Wako Pure Chemical Industries, Ltd., 55% aqueous solution), and 0.50 g of 10% sulfuric acid, followed by stirring. Moreover, 0.10 g of the PTFE dispersion (PTFE 30J, made by Du Pont-Mitsui Fluorochemicals Company, Ltd.) was added to a resultant solution, followed by stirring/mixing by the ultrasonic homogenizer. In such a way, a membrane-electrode junction agent was obtained.

3. Fabrication of Membrane-Electrode Assembly

A membrane-electrode assembly was fabricated by the same method as that in Example 4.

Example 7

1. Fabrication of Proton Conducting Membrane

The same membrane as that in Example 5 was used.

2. Production Process of Membrane-Electrode Junction Agent

Under the ice-cold condition, mixed by the ultrasonic homogenizer were: 0.50 g of a 15% aqueous solution of the polystyrene sulfonic acid (made by Sigma-Aldrich Corporation); 2.0 g of a 15% aqueous solution of the poly(2-acrylamide-2-methylpropane sulfonic acid) (made by Sigma-Aldrich Corporation; average molecular weight: approximately two millions); 4.5 g of a 10% aqueous solution of the polyethylene glycol (made by Wako Pure Chemical Industries, Ltd.; average molecular weight: approximately two millions); 0.050 g of glycerol propoxylate triglycidyl ether (made by Sigma-Aldrich Corporation); 0.45 g of a 10% aqueous solution of the sodium silicate (made by Wako Pure Chemical Industries, Ltd., 55% aqueous solution); and 0.31 g of 10% sulfuric acid. Moreover, a liquid was obtained by mixing 0.040 g of 3-glycidyloxypropyltrimethoxysilane (made by Tokyo Chemical Industry Co., Ltd.), 0.030 g of the tetraethoxysilane (KBE-04, made by Shin-Etsu Chemical Co., Ltd.) and 0.070 g of methanol together. The obtained liquid was dropped into the above-described mixture, and was mixed together by the ultrasonic homogenizer under the ice-cold condition. In such a way, a membrane-electrode junction agent was produced.

3. Fabrication of Membrane-Electrode Assembly

A membrane-electrode assembly was fabricated by the same method as that in Example 4.

Comparative Example 1

In "2. Production process of membrane-electrode junction agent" in Example 1, a liquid was produced by mixing 2.0 g of a 2.5% aqueous solution of 3-(trihydroxysilyl)-1-propane sulfonic acid (made by Gelest, Inc., dilution with water of 33% aqueous solution) and 0.20 g of the tetramethoxysilane (KBM-04, made by Shin-Etsu Chemical Co., Ltd.) with each other. Except for this, a membrane-electrode assembly was obtained in a similar way to Example 1.

Comparative Example 2

A 5% solution of commercially available ion-exchanged resin (Nafion perfluoro ion-exchanged resin, made by Sigma-Aldrich Corporation) was coated on both surfaces of the proton conducting membrane, and a similar heating step to that in Example 1 was performed therefor, whereby a membrane-electrode assembly was obtained.

Comparative Example 3

In Example 2, under the ice-cold condition, mixed by the ultrasonic homogenizer were: 1.0 g of a 15% aqueous solution of the polystyrene sulfonic acid (made by Sigma-Aldrich Corporation); 4.0 g of a 15% aqueous solution of the poly(2-acrylamide-2-methylpropane sulfonic acid) (made by Sigma-Aldrich Corporation; average molecular weight: approximately two millions); 2.0 g of water; 0.50 g of a 10% aqueous solution of the sodium silicate (made by Wako Pure Chemical Industries, Ltd., 55% aqueous solution); and 0.34 g of 10% sulfuric acid. In such a way, a membrane-electrode junction agent was produced. Except for this, a membrane-electrode assembly was obtained in a similar way to Example 2.

Comparative Example 4

In Example 2, under the ice-cold condition, mixed by the ultrasonic homogenizer were: 0.50 g of a 15% aqueous solution of the polystyrene sulfonic acid (made by Sigma-Aldrich Corporation); 2.0 g of a 15% aqueous solution of the poly(2-acrylamide-2-methylpropane sulfonic acid) (made by Sigma-Aldrich Corporation; average molecular weight: approximately two millions); and 5.0 g of a 10% aqueous solution of the polyvinyl alcohol (made by Japan Vam & Poval Co., Ltd.; average degree of polymerization: approximately 3300; degree of saponification: 99% or more). In such a way, a membrane-electrode junction agent was produced. Except for this, a membrane-electrode assembly was obtained in a similar way to Example 2.

<Evaluation Method>
(1) Evaluation of Adhesion State

One of the electrodes of the membrane-electrode assembly obtained by the manufacturing method according to the embodiment of the present invention was fixed by a double-sided tape, a side portion of the proton conducting membrane, of which area was 75 mm$^2$, was peeled off at a speed of 1 cm/sec by using a 90° C. peel testing machine, and adhesion strength between the electrode and the membrane in this case was taken as an index of initial adhesiveness. Moreover, after being immersed in hot water of 100° C. for one hour, another membrane-electrode assembly was taken out therefrom, and moisture on surfaces of the membrane-electrode assembly was wiped out, and thereafter, the membrane-electrode assembly was naturally dried at the room temperature for 12 hours or more. One of the electrodes of the membrane-electrode assembly was peeled off by the same method as above, and adhesion strength between the electrode and the membrane was taken as an index of adhesion durability. As an evaluation criterion for comparing the adhesivenesses of the MEAs fabricated in the examples and the comparative examples, an MEA was fabricated, in which Nafion 117 (made by Du Pont Corporation) used as a proton conducting membrane and sufficiently humidified and the above-mentioned gas diffusion electrodes (cathode side: made by E-TEK Inc. in the U.S.A.; area: 2.5×2.5 cm; platinum-supported amount: 0.5 mg/cm$^2$, and anode side: made by E-TEK Inc. in the U.S.A.; area: 2.5×2.5 cm; platinum supported amount: 0.5 mg/cm$^2$; ruthenium supported amount: 0.3 mg/cm$^2$) were pressed at 140° C.-1 kN for three minutes by the press machine (made by Sintokogio, Ltd.). Then, average strength of this MEA was defined as 100, and relative values in the examples and the comparative examples with respect to this evaluation criterion were evaluated. Note that the average strength refers to a value of peel strength, which was obtained by averaging such strengths after the peel strength rises with time after the test was started and then becomes substantially constant.

(2) Evaluation of Power Generation Performance

Each of the membrane-electrode assemblies was set into a single cell (JARI standard cell) for the fuel cell in accordance with a determined method. This cell was set into a fuel cell power generation evaluation apparatus ("As-510", made by NF Corporation). Then, the cell was operated under conditions where a cell temperature was 60° C., a concentration of methanol was 1 mol %, a flow rate thereof was 1 cc per minute, and a flow rate of the air was 100 cc per minute. Then, currents (I) and voltages (V) of the respective cells were measured, and the maximum outputs thereof were compared with one another.

As an evaluation criterion for comparing the power generation performances of the MEAs fabricated in the examples and the comparative examples, such an MEA was used, in which Nafion 117 (made by Du Pont Corporation) used as a proton conducting membrane and sufficiently humidified and the above-mentioned gas diffusion electrodes (cathode side: made by E-TEK Inc. in the U.S.A.; area: 2.5×2.5 cm; platinum-supported amount: 0.5 mg/cm$^2$, and anode side: made by E-TEK Inc. in the U.S.A.; area: 2.5×2.5 cm; platinum supported amount: 0.5 mg/cm$^2$; ruthenium supported amount: 0.3 mg/cm$^2$) were pressed at 140° C.-1 kN for three minutes by the press machine (made by Sintokogio, Ltd.). Then, the maximum output of this MEA was defined as 100, and relative values in the examples and the comparative examples with respect to this evaluation criterion were evaluated.

<Results>
Results are shown in Table 1.

TABLE 1

|  | INITIAL ADHESIVENESS | ADHESION DURABILITY | MAXIMUM OUTPUT |
|---|---|---|---|
| EXAMPLE 1 | 105 | 98 | 90 |
| EXAMPLE 2 | 108 | 103 | 105 |
| EXAMPLE 3 | 110 | 105 | 108 |
| EXAMPLE 4 | 115 | 109 | 110 |
| EXAMPLE 5 | 119 | 111 | 119 |
| EXAMPLE 6 | 120 | 115 | 108 |
| EXAMPLE 7 | 116 | 114 | 102 |
| COMPARATIVE EXAMPLE 1 | 91 | 0 | 89 |
| COMPARATIVE EXAMPLE 2 | 50 | 0 | 83 |
| COMPARATIVE EXAMPLE 3 | 90 | 54 | 101 |
| COMPARATIVE EXAMPLE 4 | 90 | 66 | 98 |

In accordance with Table 1, Example 1 is excellent in initial adhesiveness in comparison with the comparative examples. It is understood that Examples 2 to 7 are excellent in initial adhesiveness and adhesion durability in comparison with the comparative examples, and that the maximum outputs thereof also exceed those in the comparative examples. Although Comparative examples 3 and 4 have a little good adhesion durability in comparison with Comparative examples 1 and 2, it is understood that Examples 4, 5, 6 and 7 are considerably excellent in adhesion durability even in comparison with Comparative examples 3 and 4.

A description will be made below of Examples 8 to 14 and Reference comparative examples 1 and 2, for which evaluations were made by another evaluation method than the above-mentioned evaluation method in this embodiment.

Example 8

1. Fabrication of Proton Conducting Membrane 0.20 g of the 3-mercaptopropyl trimethoxysilane (Sila-Ace S-810, made by Chisso Corporation), 0.80 g of the tetraethoxysilane (KBE-04, made by Shin-Etsu Chemical Co., Ltd.), 0.20 g of diethylene glycol (made by Wako Pure Chemical Industries, Ltd.), 0.60 g of triethylamine and 0.25 g of water were dissolved into 1.8 mL of tetrahydrofuran, and were radically stirred for 10 minutes at the room temperature. A mixture thus obtained was poured into Petri dish (made by Flonchemical Co. Ltd.) made of Teflon® with an inner diameter of 15 cm, and the Petri dish was covered with a glass plate.

A membrane-like matter thus fabricated was left standing still as it was for three days at the room temperature, and was gelated. The membrane thus gelated was heated at 80° C. in the oven, left in the desiccator filled with water for 12 hours, and was further heated at 120° C. in the oven for 24 hours. The obtained membrane-like matter was taken out of the oven, and was immersed in water, 1N sulfuric acid and water individually for one hour, whereby the unreacted matter, the catalyst and the polarity control agent were extracted from the membrane.

The obtained membrane was immersed into the peracetic acid prepared by mixing 125 mL of the acetic acid and 100 mL of the 30% hydrogen peroxide water with each other, followed by heating at 80° C. for one hour. A membrane thus obtained was taken out of the peracetic acid solution, and was immersed into water at 80° C. three times individually for one hour, whereby the peracetic acid solution was sufficiently extracted. As a result, a somewhat whitish membrane was obtained. This membrane had a circular shape with a diameter of approximately 4 cm, in which a thickness was 75 μm.

2. Production of Membrane-Electrode Junction Agent

Mixed were: 2.0 g of a 2.5% aqueous solution of the poly (2-acrylamide-2-methylpropane sulfonic acid) (in which a 15% aqueous solution made by Sigma-Aldrich Corporation was diluted); 0.20 g of the tetramethoxysilane (KBM-04, made by Shin-Etsu Chemical Co., Ltd.); and 0.20 g of the PTFE dispersion (PTFE 30J, made by Du Pont-Mitsui Fluorochemicals Company, Ltd.). In such a way, a membrane-electrode junction agent was obtained.

3. Fabrication of Membrane-Electrode Assembly

The membrane-electrode junction agent obtained in the above-described process was sufficiently impregnated into both surfaces of the proton conducting membrane according to the present invention. Then, the gas diffusion electrode (made by E-TEK Inc. in the U.S.A.; area: 2.5×2.5 cm; platinum-supported amount: 0.5 mg/cm²) was pasted to the cathode side of the proton conducting membrane, and the gas diffusion electrode (made by E-TEK Inc. in the U.S.A.; area: 2.5×2.5 cm; platinum supported amount: 0.5 mg/cm²; ruthenium supported amount: 0.3 mg/cm²) was pasted to the anode side of the proton conducting membrane.

An assembly thus obtained was heated at 80° C. for one hour in the oven, and was thereafter pressed at 120° C.-1 kN for three minutes by the press machine (made by Sintokogio, Ltd.), whereby a membrane-electrode assembly was obtained.

Example 9

In the production process of the membrane-electrode junction agent of Example 8, a liquid was produced by mixing 2.0 g of a 2.5% aqueous solution of the poly(2-acrylamide-2-methylpropane sulfonic acid) (in which a 15% aqueous solution made by Sigma-Aldrich Corporation was diluted), 0.20 g of the tetramethoxysilane (KBM-04, made by Shin-Etsu Chemical Co., Ltd.), 0.20 g of the PTFE dispersion (PTFE 30J, made by Du Pont-Mitsui Fluorochemicals Company, Ltd.) and 0.50 g of a 5% aqueous solution of polyvinyl alcohol (made by Wako Pure Chemical Industries, Ltd.; a degree of polymerization: 2,000) with one another. Except for this, a membrane-electrode assembly was obtained in a similar way to Example 8.

Example 10

1. Fabrication of Proton Conducting Membrane 0.12 g of water and 0.060 g of triethylamine were dropped into a liquid obtained by mixing 4.07 g of the copolymer (X-41-1805, made by Shin-Etsu Chemical Co., Ltd.) of 3-mercaptopropyl trimethoxysilane and tetraethoxysilane and 1.0 g of the tetraethoxysilane (KBE-04, made by Shin-Etsu Chemical Co., Ltd.) with each other. A resultant solution was stirred at the room temperature for 20 minutes until becoming transparent, and was thereafter developed on a fluorine film. On this solution, a polyethylene-made porous material (average pore diameter: 0.5 μm; thickness: 50 μm; cut into a square with a side of 10 cm) was covered, and the porous material was impregnated with this liquid. The liquid was impregnated into the porous material by using the polyethylene-made pallet so as not to cause unevenness. Thereafter, such a membrane obtained after the impregnation was covered with a fluorine resin film, and the applicator was allowed to level this resultant from the above so that a membrane thickness of the impregnated porous material (membrane) could be 50 μm.

The impregnated porous material was aged at the room temperature for eight hours while being left covered with the fluorine resin film, and thereafter, the fluorine resin film was peeled off therefrom, and the porous material was further aged for 16 hours. The aged membrane was sandwiched between fluorine resin films, these were further sandwiched between two glass plates, and in this state, these were put into the glass-made container together with 500 mL of water, and was heated and cured at 80° C. for 24 hours by using the gear oven. Thereafter, these were fired at 120° C. for eight hours. The fired membrane was moved to another glass-made container, and was immersed into a 1N hydrochloric acid solution and water individually for one hour under the condition of 80°

C., whereby the unreacted matter and the catalyst were extracted from the membrane. After an extract was removed, the membrane was immersed into the peracetic acid prepared by mixing 125 mL of acetic acid and 100 mL of 30% hydrogen peroxide water with each other, and was heated at 60° C. for one hour by the hot plate. The obtained membrane was taken out of the peracetic acid solution, and was immersed into water of 80° C. three times individually for one hour, whereby the peracetic acid solution was sufficiently removed therefrom. In such a way, a translucent membrane was obtained. This was defined as a proton conducting membrane. Subsequent processes were performed in a similar way to Example 8, whereby a membrane-electrode assembly was obtained.

Example 11

1. Fabrication of Proton Conducting Membrane 53.0 g of 3-mercaptopropyl trimethoxysilane (KBM-803, made by Shin-Etsu Chemical Co., Ltd.), 131.2 g of the tetraethoxysilane (KBE-04, made by Shin-Etsu Chemical Co., Ltd.) and 26.5 g of methanol were measured in the flask, and were stirred for 10 minutes at 0° C. To a mixture thus obtained, a solution obtained by mixing 15.6 g of 0.01N hydrochloric acid and 20.8 g of the methanol with each other was added, followed by stirring for one hour at 0° C. A solution thus obtained was heated up to 40° C., followed by further stirring for two hours. Subsequently, a solution obtained by mixing 0.114 g of potassium fluoride (made by Wako Pure Chemical Industries, Ltd.) and 29.7 g of the methanol with each other was added to a resultant, and a mixed solution thus obtained was stirred for one hour at 40° C., and was heated up to 80° C., followed by further stirring for two hours. This mixed solution was cooled down to 0° C., and thereafter, alcohol was removed therefrom by fractional distillation in vacuum at 40° C. A solution thus obtained was cooled down to 0° C., and 200 mL of diethyl ether was added thereto, followed by stirring for 10 minutes at 0° C., and thereafter, a resultant solution was filtered by using a membrane filter (Omnipore membrane, made by Nihon Millipore K. K.; pore diameter: 0.2 μm). The diethyl ether was removed from obtained filtrate by the fractional distillation in vacuum at 40° C., and a mercapto group-containing silane oligomer was obtained.

0.11 g of water and 0.050 g of triethylamine were dropped into a liquid obtained by mixing 1.86 g of the obtained mercapto group-containing silane oligomer, 0.62 g of triethoxy vinyl silane (KBE-1003, made by Shin-Etsu Chemical Co., Ltd.) and 3.51 g of the tetraethoxysilane (KBE-04, made by Shin-Etsu Chemical Co., Ltd.) with one another. After a mixed solution thus obtained was stirred for 10 minutes at the room temperature, 12.5 g of a 30% aqueous solution of 2-acrylamide-2-methylpropane sulfonic acid (made by Sigma-Aldrich Corporation), 0.30 g of the 1,4-divinylbenzene (made by Wako Pure Chemical Industries, Ltd.) and 1.0 g of an aqueous solution of the N,N'-methylene-bis-acrylamide (made by Wako Pure Chemical Industries, Ltd.) were dropped thereinto. A mixed solution thus obtained was cooled down to 0° C., followed by stirring for five minutes. 0.10 g of a photopolymerization initiator (KR-02, made by Light Chemical Industries Co., Ltd.) and 0.10 g of azobis(isobutyronitrile) (made by Wako Pure Chemical Industries, Ltd.) as a thermal polymerization initiator were added to the mixed solution, whereby a polymerizable composition was obtained.

A solution obtained by dissolving 1.0 g of the obtained polymerizable composition into 10 mL of N,N-dimethylformamide was cast in the form of a Teflon® substrate, was subjected to UV irradiation, and was thereafter aged for 80 hours at the room temperature. After being heated/cured for 24 hours at 130° C. by using the gear oven, a mixture thus obtained was immersed into peracetic acid prepared by mixing 60 mL of acetic acid and 15 mL of 30% hydrogen peroxide water with each other, and was heated at 60° C. for one hour on the hot plate. A membrane thus obtained was taken out of the peracetic acid solution, and was immersed into water of 80° C. twice individually for one hour, whereby the peracetic acid solution was sufficiently removed therefrom. In such a way, a translucent proton conducting membrane was obtained. Subsequent processes were performed in a similar way to Example 9, whereby a membrane-electrode assembly was obtained.

Example 12

1. Fabrication of Proton Conducting Membrane

On a fluorine resin film, 3.0 g of the polymerizable composition obtained in Example 11 was impregnated into a polyethylene-made porous material (average pore diameter: 0.5 μm; thickness: 50 μm; cut into a square with a side of 10 cm). Such a membrane obtained after the impregnation was covered with a fluorine resin film, and the applicator was allowed to level this resultant from the above so that a membrane thickness of the impregnated porous material (membrane) could be 50 μm. The film was peeled off from the membrane, and the membrane was subjected to the UV irradiation, and was thereafter aged for 80 hours at the room temperature. The aged membrane was newly covered with fluorine resin films, and was sandwiched between two glass plates while interposing the fluorine resin films therebetween, and in this state, was put into the glass-made container together with 500 mL of water. After being heated/cured for 24 hours at 80° C. by using the gear oven, a resultant thus obtained was fired at 120° C. for eight hours, whereby a membrane was obtained. Thereafter, the fired resultant was subjected to the same oxidation process as that in Example 11, whereby a translucent proton conducting membrane was obtained. Subsequent processes were performed in a similar way to Example 9, whereby a membrane-electrode assembly was obtained.

Example 13

1. Fabrication of Proton Conducting Membrane

The same proton conducting membrane as that in Example 12 was used.

2. Production of Membrane-Electrode Junction Agent

While being stirred under the ice-cold condition, 0.15 g of 10% sulfuric acid was dropped into a liquid obtained by mixing 1.24 g of the 3-trimethoxysilyl propyl acrylate (made by Tokyo Chemical Industry Co., Ltd.), 3.51 g of the tetraethoxysilane (KBE-04, made by Shin-Etsu Chemical Co., Ltd.) and 3.0 g of methanol with one another. A resultant solution was further stirred for 30 minutes.

Stirred/mixed by the ultrasonic homogenizer were: 10 g of a 40% aqueous solution of the 2-acrylamide-2-methylpropane sulfonic acid (made by Wako Pure Chemical Industries, Ltd.); 2.0 g a 5% aqueous solution of the N,N'-methylene-bis-acrylamide (made by Wako Pure Chemical Industries, Ltd.); and 1.0 g of a 10% aqueous solution of the polymerization initiator V-50 (made by Wako Pure Chemical Industries, Ltd., 2,2'-azobis(2-methylpropionamizine)dihydrochloride). A solution thus stirred/mixed was dropped into the above-described silane compound solution.

3.0 g of a polymerizable composition solution thus obtained was mixed with 4.0 g of a 10% aqueous solution of the polyvinyl alcohol (made by Japan Vam & Poval Co., Ltd.; average degree of polymerization: approximately 3300; degree of saponification: 99% or more), 0.40 g of a 10% aqueous solution of the sodium silicate (made by Wako Pure Chemical Industries, Ltd., 55% aqueous solution); and 0.50 g of 10% sulfuric acid, followed by stirring, whereby a membrane-electrode junction agent was obtained.

3. Fabrication of Membrane-Electrode Assembly

The membrane-electrode junction agent obtained in the above-described process was coated on both surfaces of the proton conducting membrane, and was sandwiched between fluorine resin films, and a resultant thus obtained was leveled so that a thickness of the junction layer on each side could become 20 microns, and was dried and cured in the oven at 80° C. for one hour, whereby a membrane (membrane having junction layers) on surfaces of which junction layers were formed was obtained. Here, the "junction layers" refer to the ones in which the junction agent was coated on the surfaces of the membrane in a layer shape, followed by drying. The junction layers take any one form of a gel-like form, a semi-solid form and a completely solid form depending on the conditions.

After the above-described membrane having the junction layers was immersed in 5% sulfuric acid for one minute, the membrane was washed by pure water several times, whereby the membrane having the junction layers was softened and/or swelled by water. The gas diffusion electrode (made by E-TEK Inc. in the U.S.A.; area: 2.5×2.5 cm; platinum-supported amount: 0.5 mg/cm$^2$) was pasted to a cathode side of the membrane having the junction layers, which was softened and/or swelled by water, and the gas diffusion electrode (made by E-TEK Inc. in the U.S.A.; area: 2.5×2.5 cm; platinum supported amount: 0.5 mg/cm$^2$; ruthenium supported amount: 0.3 mg/cm$^2$) was pasted to an anode side of the membrane concerned, whereby a membrane-electrode assembly was fabricated. The obtained membrane-electrode assembly was pressed at 120° C.-1 kN for 10 minutes by the press machine (made by Sintokogio, Ltd.), and was subsequently heated in the oven at 80° C. for one hour, whereby a membrane-electrode assembly was obtained.

Example 14

1. Fabrication of Proton Conducting Membrane

The same proton conducting membrane as that in Example 12 was used.

2. Production of Membrane-Electrode Junction Agent

While being stirred under the ice-cold condition, 0.18 g of 10% sulfuric acid was dropped into a liquid obtained by mixing 0.51 g of the vinyl trimethoxysilane (made by Tokyo Chemical Industry Co., Ltd.), 0.64 g of the 3-trimethoxysilyl propyl acrylate (made by Tokyo Chemical Industry Co., Ltd.), 3.51 g of the tetraethoxysilane (KBE-04, made by Shin-Etsu Chemical Co., Ltd.) and 3.0 g of methanol with one another. A resultant solution was further stirred for 30 minutes.

Stirred/mixed by the ultrasonic homogenizer were: 4.4 g of a 25% aqueous solution of the vinyl sulfonic acid (made by Tokyo Chemical Industry Co., Ltd.), 6.5 g of a 40% aqueous solution of the 2-acrylamide-2-methylpropane sulfonic acid (made by Wako Pure Chemical Industries, Ltd.), 2.0 g of a 5% aqueous solution of the N,N'-methylene-bis-acrylamide (made by Wako Pure Chemical Industries, Ltd.), and 1.0 g of a 10% aqueous solution of the polymerization initiator V-50 (made by Wako Pure Chemical Industries, Ltd., 2,2'-azobis (2-methylpropionamizine)dihydrochloride) together. Then, the obtained liquid was dropped into the above-described silane compound solution.

3.5 g of a polymerizable composition solution thus obtained was mixed with 3.0 g of a 10% aqueous solution of the polyvinyl alcohol (made by Japan Vam & Poval Co., Ltd.; average degree of polymerization: approximately 3300; degree of saponification: 99% or more), 0.40 g of a 10% aqueous solution of the sodium silicate, and 0.50 g of 10% sulfuric acid, followed by stirring. Moreover, 0.10 g of the PTFE dispersion (PTFE 30J, made by Du Pont-Mitsui Fluorochemicals Company, Ltd.) was added to a resultant solution, followed by stirring/mixing by the ultrasonic homogenizer. In such a way, a membrane-electrode junction agent was obtained.

3. Fabrication of Membrane-Electrode Assembly

A membrane-electrode assembly was fabricated by the same method as that in Example 9.

Reference Comparative Example 1

In the process of "2. Production of membrane-electrode junction agent" in Example 8, a liquid was produced by mixing 2.0 g of a 2.5% aqueous solution of the 3-(trihydroxysilyl)-1-propane sulfonic acid (made by Gelest, Inc., dilution with water of 33% aqueous solution) and 0.20 g of the tetramethoxysilane (KBM-04, made by Shin-Etsu Chemical Co., Ltd.) with each other. Except for this, a membrane-electrode assembly was obtained in a similar way to Example 8.

Reference Comparative Example 2

A 5% solution of the commercially available ion-exchanged resin (Nafion perfluoro ion-exchanged resin, made by Sigma-Aldrich Corporation) was coated on both surfaces of the proton conducting membrane, and a similar heating step to that in Example 8 was performed therefor, whereby a membrane-electrode assembly was obtained.

<Evaluation Method>
(1) Evaluation of Adhesion State

One of the electrodes of the membrane-electrode assembly was fixed by the double-sided tape, a side portion of the proton conducting membrane, of which area was 75 mm$^2$, was peeled off at a speed of 1 cm/sec by using the 90° C. peel testing machine, and adhesion strength between the electrode and the membrane in this case was taken as an index of the initial adhesiveness. Moreover, after being immersed in hot water of 100° C. for one hour, another membrane-electrode assembly was taken out therefrom, and moisture on surfaces of the membrane-electrode assembly was wiped out, and thereafter, the membrane-electrode assembly was naturally dried at the room temperature for 12 hours or more. One of the electrodes of the membrane-electrode assembly was peeled off by the same method as above, and adhesion strength between the electrode and the membrane was taken as an index of the adhesion durability. As a comparison subject, the one (MEA) was used, in which Nafion 117 (made by Du Pont Corporation) used as a proton conducting membrane and sufficiently humidified and the above-mentioned gas diffusion electrodes (cathode side: made by E-TEK Inc. in the U.S.A.; area: 2.5×2.5 cm; platinum supported amount: 0.5 mg/cm$^2$, and anode side: made by E-TEK Inc. in the U.S.A.; area: 2.5×2.5 cm; platinum supported amount: 0.5 mg/cm$^2$; ruthenium supported amount: 0.3 mg/cm$^2$) were pressed at 120° C.-1 kN for three minutes by the press machine (made by Sintokogio, Ltd.). Then, the case where each example is equivalent to that of the comparison subject in terms of performance is represented by a single circle, the case where each example is superior to the comparison subject is represented by a double circle, and the case where each example is inferior to the comparison subject is represented by a cross.

(2) Evaluation of Power Generation Performance

Each of the membrane-electrode assemblies was set into the single cell (JARI standard cell) for the fuel cell in accordance with the determined method. This cell was set into the fuel cell power generation evaluation apparatus ("As-510", made by NF Corporation). Then, the cell was operated under conditions where a cell temperature was 60° C., a concentration of methanol was 1 mol %, a flow rate thereof was 1 cc per minute, and a flow rate of the air was 100 cc per minute. Then, currents (I) and voltages (V) of the respective cells were measured, and the maximum outputs thereof were compared with one another.

As a comparison subject, the one (MEA) was used, in which Nafion 117 (made by Du Pont Corporation) used as a proton conducting membrane and sufficiently humidified and the above-mentioned gas diffusion electrodes (cathode side: made by E-TEK Inc. in the U.S.A.; area: 2.5×2.5 cm; platinum supported amount: 0.5 mg/cm$^2$, and anode side: made by E-TEK Inc. in the U.S.A.; area: 2.5×2.5 cm; platinum supported amount: 0.5 mg/cm$^2$; ruthenium supported amount: 0.3 mg/cm$^2$) were pressed at 120° C.-1 kN for three minutes by the press machine (made by Sintokogio, Ltd.). Then, the case where each example is equivalent to that of the comparison subject in terms of the performance is represented by a single circle, the case where each example is superior to the comparison subject is represented by a double circle, and the case where each example is inferior to the comparison subject is represented by a cross.

<Results>

Results are shown in Table 2.

TABLE 2

| | INITIAL ADHESIVENESS | ADHESION DURABILITY | MAXIMUM OUTPUT |
|---|---|---|---|
| EXAMPLE 8 | ◯ | ◯ | ◎ |
| EXAMPLE 9 | ◎ | ◯ | ◎ |
| EXAMPLE 10 | ◯ | ◯ | ◎ |
| EXAMPLE 11 | ◎ | ◯ | ◎ |
| EXAMPLE 12 | ◎ | ◯ | ◎ |
| EXAMPLE 13 | ◎ | ◎ | ◎ |
| EXAMPLE 14 | ◎ | ◎ | ◎ |
| REFERENCE COMPARATIVE EXAMPLE 1 | X | X | ◯ |
| REFERENCE COMPARATIVE EXAMPLE 1 | X | X | X |

In accordance with Table 2, it is understood that, in comparison with Reference comparative examples 1 and 2, Example 8 and Example 10 have good adhesiveness, and that the maximum outputs thereof also exceed those in these reference comparative examples. It is understood that Examples 9, 11, 12, 13 and 14 have better adhesiveness in comparison with Example 8 and Example 10. Moreover, it is understood that Examples 13 and 14 are also excellent in adhesion durability.

The invention claimed is:

1. A membrane-electrode junction agent useful for joining a proton conducting membrane and electrodes arranged on both surfaces of the proton conducting membrane, comprising:
    a cross-linkable compound (X) having a silicon-oxygen bond;
    a polymer material (Y) containing an acid group, and
    a hydrophilic resin (Z) containing no acid group.

2. The membrane-electrode junction agent according to claim 1, wherein the polymer material (Y) is a composite of a monomer (V) containing an acid group and a monomer (W) not containing an acid group and containing silicon.

3. The membrane-electrode junction agent according to claim 1, wherein the polymer material (Y) contains:
    an acid group-containing polymer obtained by polymerizing a monomer (V') having an acid group; and
    a polymerizable unsaturated double bond.

4. The membrane-electrode junction agent according to claim 1, wherein the acid group is any of a sulfonic acid group, a carboxylic acid group and a phosphoric acid group.

5. The membrane-electrode junction agent according to claim 1, wherein the cross linkable compound (X) contains an aqueous solution of silica and/or silicate.

6. The membrane-electrode junction agent according to claim 1, wherein the cross linkable compound (X) contains:
    liquid alkoxysilane; and
    an aqueous solution of silica and/or silicate.

7. The membrane-electrode junction agent according to claim 1, wherein the hydrophilic resin (Z) containing no acid group is either polyvinyl alcohol or polyethylene glycol.

8. A proton conducting membrane structure comprising:
    a proton conducting membrane; and
    a junction layer formed of a membrane-electrode junction agent, being provided on one surface or both surfaces of the proton conducting membrane,
    wherein said membrane-electrode junction agent comprises a cross-linkable compound (X) having a silicon-oxygen bond; a polymer material (Y) containing an acid group and a hydrophilic resin (Z) containing no acid group.

9. The proton conducting membrane structure according to claim 8, wherein the cross linkable compound (X) and the polymer material (Y) are bonded to each other by a silicon-oxygen bond.

10. The proton conducting membrane structure according to claim 8, wherein the junction layer is composed of a continuum of particles, and in addition, an acid group is imparted to surfaces of the particles, and proton conduction paths is formed in gaps among the particles.

11. The proton conducting membrane structure according to claim 10, wherein an average particle diameter of the particles is 3 to 200 nm.

12. The proton conducting membrane structure according to claim 8, wherein the proton conducting membrane has a cross-linked structure.

13. The proton conducting membrane structure according to claim 8, wherein the proton conducting membrane is a proton conducting membrane comprising:
an acid group-containing structure (H); and
a silicon-oxygen bonding structure (A) containing a cross-linked structure by a silicon-oxygen bond, and the silicon-oxygen bonding structure (A) is a structure represented by a following general formula (I):

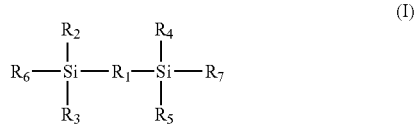

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_2$, $R_3$ and $R_6$ is O—Si concerned with the cross-link, and at least one of $R_4$, $R_5$ and $R_7$ is O—Si concerned with the cross-link).

14. The proton conducting membrane structure according to claim 8, wherein the proton conducting membrane is a proton conducting membrane comprising a silicon-oxygen bonding structure (A) containing a cross-linked structure by a silicon-oxygen bond and an acid group-containing structure (B) covalently bonded to a silane compound and having an acid group, being coupled to each other by a silicon-oxygen bond,
wherein the silicon-oxygen bonding structure (A) is a structure represented by a following general formula (I):

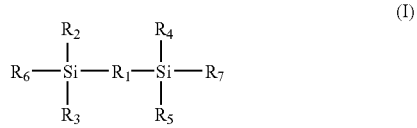

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_2$, $R_3$ and $R_6$ is O—Si concerned with the cross-link, and at least one of $R_4$, $R_5$ and $R_7$ is O—Si concerned with the cross-link).

15. The proton conducting membrane structure according to claim 8, wherein the proton conducting membrane is a proton conducting membrane comprising a silicon-oxygen bonding structure (A) containing a cross-linked structure by a silicon-oxygen bond and an acid group-containing structure (B) covalently bonded to a silane compound and having an acid group, being coupled to each other by a silicon-oxygen bond,
wherein the silicon-oxygen bonding structure (A) is a structure represented by a following general formula (I):

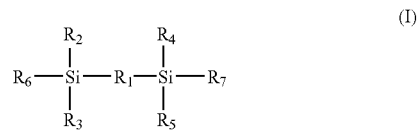

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_2$, $R_3$ and $R_6$ is O—Si concerned with the cross-link, and at least one of $R_4$, $R_5$ and $R_7$ is O—Si concerned with the cross-link),
wherein a structure in which a silane compound (α) having a polymerizable unsaturated double bond and an acid group-containing compound (β) having an acid group and a polymerizable unsaturated double bond are covalently bonded to each other is contained in the acid group-containing structure (B).

16. A membrane-electrode assembly comprising:
a proton conducting membrane;
a junction layer formed of a membrane-electrode junction agent and being provided on both surfaces of the proton conducting membrane;
a fuel electrode; and
an air electrode,
wherein said membrane-electrode junction agent comprises a cross-linkable compound (X) having a silicon-oxygen bond; a polymer material (Y) containing an acid group and a hydrophilic resin (Z) containing no acid group.

17. A polymer electrolyte fuel cell comprising the membrane-electrode assembly according to claim 16.

18. A polymer electrolyte fuel cell comprising:
a unit cell made of the membrane-electrode assembly according to claim 16; and
a pair of separators which serve as passages of fuel and air, being arranged on outsides of the unit cell,
wherein a plurality of the unit cells adjacent to one another are coupled to one another.

19. A manufacturing method of a membrane-electrode assembly, comprising:
forming a membrane having a junction layer by coating a membrane-electrode junction agent, comprising a cross-linkable compound (X) having a silicon-oxygen bond and a polymer material (Y) containing an acid group on both surfaces of a proton conducting membrane, followed by drying;
softening and/or swelling the membrane having the junction layer by impregnating a polar solvent into the membrane having the junction layer; and
pasting a fuel electrode and an air electrode to the softened and/or swelled membrane having the junction layer, followed by heat pressing.

20. A proton conducting membrane structure comprising:
a proton conducting membrane; and
a junction layer formed of a membrane-electrode junction agent, being provided on one surface or both surfaces of the proton conducting membrane,
wherein said membrane-electrode junction agent comprises a cross-linkable compound (X) having a silicon-oxygen bond and a polymer material (Y) containing an acid group,
wherein the junction layer is composed of a continuum of particles, and in addition, an acid group is imparted to surfaces of the particles, and proton conduction paths is formed in gaps among the particles.

21. The proton conducting membrane structure according to claim 20, wherein an average particle diameter of the particles is 3 to 200 nm.

* * * * *

UNITED STATES PATENT AND TRADEMARK OFFICE
CERTIFICATE OF CORRECTION

PATENT NO. : 8,318,377 B2
APPLICATION NO. : 12/531242
DATED : November 27, 2012
INVENTOR(S) : Toshihito Miyama, Yoshiharu Konno and Hideyasu Nakajima It is certified that error appears in the above-identified patent and that said Letters Patent is hereby corrected as shown below:

Title Page, Item (75) Inventors, first inventor's name delete "Toshihito MIYAMI" and insert
--Toshihito MIYAMA--

Signed and Sealed this
Nineteenth Day of February, 2013

Teresa Stanek Rea
*Acting Director of the United States Patent and Trademark Office*